US012785528B2

(12) United States Patent
Zhu et al.

(10) Patent No.: US 12,785,528 B2
(45) Date of Patent: Nov. 3, 2026

(54) VIBRATION MOTOR AND TERMINAL DEVICE

(71) Applicant: Honor Device Co., Ltd., Shenzhen (CN)

(72) Inventors: Jianwei Zhu, Shenzhen (CN); Song Huang, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 747 days.

(21) Appl. No.: 18/252,050

(22) PCT Filed: Sep. 2, 2022

(86) PCT No.: PCT/CN2022/116910
§ 371 (c)(1),
(2) Date: May 8, 2023

(87) PCT Pub. No.: WO2023/071527
PCT Pub. Date: May 4, 2023

(65) Prior Publication Data

US 2023/0412058 A1 Dec. 21, 2023

(30) Foreign Application Priority Data

Oct. 30, 2021 (CN) ......................... 202111278350.0

(51) Int. Cl.
*H02K 33/02* (2006.01)
*H02K 5/10* (2006.01)
(Continued)

(52) U.S. Cl.
CPC ............... *H02K 33/02* (2013.01); *H02K 5/10* (2013.01); *H02K 5/225* (2013.01); *H02K 33/16* (2013.01);
(Continued)

(58) Field of Classification Search
CPC ..... H02K 33/02; H02K 33/16; H04M 1/0214; H04M 1/0216; H04M 1/0218; H04M 1/022; H04M 1/0222
See application file for complete search history.

(56) References Cited

U.S. PATENT DOCUMENTS

2010/0213773 A1* 8/2010 Dong ..................... H02K 33/16 310/25
2014/0015346 A1* 1/2014 Schober ................ H02K 33/16 310/15
(Continued)

FOREIGN PATENT DOCUMENTS

CN 105790541 A 7/2016
CN 205847044 U 12/2016
(Continued)

OTHER PUBLICATIONS

Mao (CN 205960920 U) English Translation. (Year: 2017).*

*Primary Examiner* — Tulsidas C Patel
*Assistant Examiner* — Robert E Mates
(74) *Attorney, Agent, or Firm* — Conley Rose, P.C.

(57) ABSTRACT

This disclosure relates to the field of terminal device technologies, and provides a vibration motor and a terminal device, to reduce a thickness of a terminal device without sacrificing performance of a vibration motor. The terminal device includes a first screen, a first middle frame, and a vibration motor. At least a part of the first screen is located on one side of the first middle frame and is stacked with the first middle frame. The vibration motor is located on a side that is of the first middle frame and that is away from the at least part of the first screen. The vibration motor includes a housing, one end of the housing is opened to form an opening, the opening faces the first middle frame, and an edge of the housing at the opening is fastened to the first middle frame.

20 Claims, 16 Drawing Sheets

(51) Int. Cl.

| | |
|---|---|
| ***H02K 5/22*** | (2006.01) |
| ***H02K 33/16*** | (2006.01) |
| ***H04M 1/02*** | (2006.01) |
| ***H04M 1/18*** | (2006.01) |

(52) U.S. Cl.

CPC ....... *H04M 1/0216* (2013.01); *H04M 1/0268* (2013.01); *H04M 1/0277* (2013.01); *H04M 1/18* (2013.01)

(56) References Cited

U.S. PATENT DOCUMENTS

| | | | | |
|---|---|---|---|---|
| 2016/0233752 | A1 | 8/2016 | Jun et al. | |
| 2017/0033652 | A1* | 2/2017 | Mao | H02K 33/16 |
| 2018/0039410 | A1 | 2/2018 | Kim et al. | |
| 2018/0152090 | A1* | 5/2018 | Umehara | H02K 33/02 |
| 2019/0131045 | A1* | 5/2019 | Nam | H01F 7/021 |
| 2023/0078037 | A1 | 3/2023 | Zhang et al. | |

FOREIGN PATENT DOCUMENTS

| | | | | |
|---|---|---|---|---|
| CN | 205960920 | U | * | 2/2017 |
| CN | 205960923 | U | | 2/2017 |
| CN | 107257190 | A | | 10/2017 |
| CN | 206743014 | U | | 12/2017 |
| CN | 108650599 | A | | 10/2018 |
| CN | 208369340 | U | | 1/2019 |
| CN | 212034162 | U | | 11/2020 |
| CN | 113364898 | A | | 9/2021 |
| JP | 2000166173 | A | | 6/2000 |

* cited by examiner

A-A

200

C-C

104

104

E-E

104

VIBRATION MOTOR AND TERMINAL DEVICE

CROSS-REFERENCE TO RELATED APPLICATIONS

This application is a national stage of International Application No. PCT/CN2022/116910, filed on Sep. 2, 2022, which claims priority to Chinese Patent Application No. 202111278350.0, filed on Oct. 30, 2021, both of which are incorporated herein by references in their entireties.

TECHNICAL FIELD

This application relates to the field of terminal device technologies, and in particular, to a vibration motor and a terminal device with a vibration motor.

BACKGROUND

In a terminal device such as a mobile phone, a tablet, or a wearable device, vibration is usually generated by using a vibration motor, to implement functions such as an incoming call or SMS message reminder and a vibration tactile feedback. With the advance in science and technology, terminal devices gradually become thin. Especially, for a foldable phone, a thickness of the entire phone urgently needs to be reduced. Consequently, mounting space of a vibration motor in the terminal device is gradually reduced. However, because of a limitation of a condition of the vibration motor, thinning of the vibration motor causes vibration performance reduction. Therefore, a current thickness of the vibration motor becomes one of bottlenecks that impede further thinning of the terminal device. It can be learned that how to reduce a thickness of a terminal device (especially a foldable phone) without sacrificing performance of a vibration motor becomes a current design difficulty.

SUMMARY

Embodiments of this application provide a vibration motor and a terminal device, to reduce a thickness of a terminal device without sacrificing performance of a vibration motor.

To achieve the foregoing objective, the following technical solutions are used in embodiments of this application.

According to a first aspect, a terminal device is provided. The terminal device includes a first screen, a first middle frame, and a vibration motor. At least a part of the first screen is located on one side of the first middle frame and is stacked with the first middle frame. The vibration motor is located on a side that is of the first middle frame and that is away from the at least part of the first screen. The vibration motor includes a housing, one end of the housing is opened to form an opening, the opening faces the first middle frame, and an edge of the housing at the opening is fastened to the first middle frame.

In the terminal device provided in this application, the opening on the housing of the vibration motor is blocked by using the first middle frame, to form a closed housing, thereby achieving a waterproof and dustproof protection function to some extent. In addition, the first middle frame forms a wall plate of the housing of the vibration motor. Without changing a height of internal accommodation space of the vibration motor, a height of the vibration motor can be reduced, to reduce a mounting height of the vibration motor in the terminal device. This helps reduce a thickness of the terminal device. Because the height of the internal accommodation space of the vibration motor is unchanged, a design height of a structure such as a mass block in the housing does not need to be limited, so that performance of the vibration motor can be ensured.

In a possible implementation of the first aspect, the housing includes a top wall and a side frame, the side frame is disposed around a circumference of the top wall, and an end that is of the side frame and that is away from the top wall surrounds the opening. The structure of the housing is simple, and the top wall and the side frame may be formed integrally by using a stamping process. In some other embodiments, the top wall and the side frame may be formed separately and assembled together. This can facilitate assembly of an internal structure.

In a possible implementation of the first aspect, the vibration motor further includes a mass block. The mass block is disposed in the housing, and the mass block can reciprocally vibrate relative to the housing on a plane parallel to a plane on which the opening is located. Specifically, on the plane parallel to the plane on which the opening is located, a vibration path of the mass block may be a straight line, or may be a curve. A vibration direction of the mass block is perpendicular to a thickness direction of the terminal device. This helps reduce a thickness of the vibration motor, and helps reduce a mounting height of the vibration motor in the terminal device. In a possible implementation of the first aspect, an elastic assembly is configured to elastically support the mass block in the housing, and the elastic assembly allows the mass block to vibrate reciprocally in the housing. In this way, vibration stability of the mass block can be ensured.

In a possible implementation of the first aspect, the elastic assembly includes a first elastic member and a second elastic member. Both the first elastic member and the second elastic member are springs. An arrangement direction of the first elastic member, the mass block, and the second elastic member is parallel to the vibration direction of the mass block. The first elastic member includes a first fastening part, a first connection part, and a second fastening part that are connected in sequence. The first fastening part is connected to the mass block, and a connection manner includes but is not limited to welding, sticking, or integral molding. The second fastening part is connected to the side frame of the housing, and a connection manner includes but is not limited to welding, sticking, or integral molding. The first connection part is approximately of an n shape, an arch direction of the first connection part is parallel to the plane on which the opening is located, and the arch direction of the first connection part is perpendicular to the vibration direction of the mass block. The second elastic member includes a third fastening part, a second connection part, and a fourth fastening part that are connected in sequence. The third fastening part is connected to the mass block, and a connection manner includes but is not limited to welding or sticking. The fourth fastening part is connected to the side frame of the housing, and a connection manner includes but is not limited to welding or sticking. The second connection part is approximately of an n shape, and an arch direction of the second connection part is opposite to the arch direction of the first connection part. In this way, both the first elastic member and the second elastic member have a capability of deforming in a direction parallel to the vibration direction of the mass block. This structure is simple and easy to implement.

In a possible implementation of the first aspect, the vibration motor further includes a drive assembly. The drive assembly includes a magnet assembly and a coil. The magnet assembly is fastened to the mass block, the coil is located between the mass block and the top wall, the coil is fastened to the top wall of the housing, the magnet assembly cooperates with the coil to generate a Lorentz force, and the Lorentz force is used to drive the mass block to reciprocally vibrate relative to the housing on the plane parallel to the plane on which the opening is located. A structure of the drive assembly is simple, and the magnet assembly may alternatively participate in vibration as a part of the mass block. In addition, because the coil is fastened to the top wall of the housing, a layout is proper, and a support structure of the coil does not need to be additionally disposed. This helps reduce a height of the vibration motor.

In a possible implementation of the first aspect, the vibration motor further includes an electrical connection structure. The electrical connection structure includes a first segment, a second segment, and a third segment that are sequentially connected. The first segment is fastened to an inner surface of the top wall, the coil is fastened to the first segment and electrically connected to the first segment, the second segment is fastened to an inner surface of the side frame, the third segment extends in a radial direction of the opening, a part of the third segment is located outside the housing, and a positive terminal and a negative terminal are disposed on the part that is of the third segment and that is located outside the housing. The electrical connection structure can lead an electrode of the coil to the third segment outside the housing, and when the vibration motor is used in the terminal device, the third segment of the electrical connection structure can be fastened and supported by using the first middle frame. That is, when the vibration motor is used in the terminal device, the third segment of the electrical connection structure is attached to and fastened to the first middle frame. Therefore, the third segment is fastened and supported by using the first middle frame.

In a possible implementation of the first aspect, the electrical connection structure is a flexible circuit board.

In a possible implementation of the first aspect, a connection lug is disposed on an outer surface of the side frame, and the edge of the housing at the opening is fastened to the first middle frame by using the connection lug. Stability and reliability of this connection manner are relatively high, and neither of a limiting structure and a buffer material layer needs to be disposed on a side that is of the housing and that is away from the first middle frame, so that a mounting height of the vibration motor on the first middle frame can be reduced to some extent. In addition, a region occupied by the connection lug is relatively small, and space is reserved on a side that is of the lug and that is away from the first middle frame, so that other parts around the vibration motor can be accommodated.

In a possible implementation of the first aspect, the connection lug includes a fastening part, a lug part, and a connection hole, the fastening part is fastened to the outer surface of the side frame, the lug part is fastened to the fastening part, the connection hole is disposed in the lug part, and an axial direction of the connection hole is consistent with an extension direction of a central axis of the opening. This structure is simple, and can implement a detachable connection between the edge of the housing at the opening and the first middle frame, to facilitate repair and replacement.

In a possible implementation of the first aspect, the edge of the housing at the opening is welded to the first middle frame. Stability of welding is relatively high, so that connection stability of the vibration motor on the first middle frame can be improved. In addition, neither of a limiting structure and a buffer material layer needs to be disposed on a side that is of the housing and that is away from the first middle frame, so that a mounting height of the vibration motor on the first middle frame can be reduced to some extent.

In a possible implementation of the first aspect, the first screen includes a first part and a second part, and the first part of the first screen is located on one side of the first middle frame and is stacked with the first middle frame. The terminal device further includes a second middle frame, where the second middle frame is rotatably connected to the first middle frame, the second part is disposed on one side of the second middle frame and is stacked with the second middle frame, the terminal device can change between an unfolded state and a folded state, and when the terminal device is in the unfolded state, the first part of the first screen and the second part of the first screen face a same side, or when the terminal device is in the folded state, the first part of the first screen and the second part of the first screen face each other or back onto each other. In this way, the terminal device is a foldable terminal device, and a wall plate of the housing of the vibration motor is formed by using the first middle frame. Without changing a height of internal accommodation space of the vibration motor, a height of the vibration motor can be reduced. This helps reduce a thickness of the foldable terminal device, to improve a hand feeling, a texture, and portability of the foldable terminal.

In a possible implementation of the first aspect, when the terminal device is in the folded state, the first part of the first screen and the second part of the first screen face each other. The terminal device further includes a second screen, where the second screen is located on a side that is of the vibration motor and that is away from the first middle frame, the second screen and the first middle frame are relatively fastened, and the vibration motor and the second screen are spaced from each other. In this way, the terminal device is an inward-foldable terminal having two screens, and a wall plate of the housing of the vibration motor is formed by using the first middle frame. Without changing a height of internal accommodation space of the vibration motor, a height of the vibration motor can be reduced. This helps reduce a thickness of the foldable terminal device, to improve a hand feeling, a texture, and portability of the foldable terminal.

In a possible implementation of the first aspect, a gap between the vibration motor and the second screen is 0.05 millimeters to 0.35 millimeters. In some embodiments, a width of the gap is 0.1 millimeters to 0.2 millimeters. The gap width is suitable, so that a thickness of the foldable terminal can be reduced while preventing the vibration motor from impacting on the second screen.

In a possible implementation of the first aspect, a height of the vibration motor is less than or equal to 3.0 millimeters. In this way, the height of the vibration motor is relatively small. This facilitates a thinning design of the terminal device.

In a possible implementation of the first aspect, there may be one or more vibration motors disposed in the terminal device. When the terminal device is a foldable terminal device, a plurality of vibration motors may all be disposed in first accommodation space of the terminal device or may all be disposed in second accommodation space of the terminal device, or some vibration motors may be disposed in the first accommodation space and the other vibration motors may be disposed in the second accommodation space. When some of a plurality of vibration motors are disposed in the first accommodation space and the other vibration motors are disposed in the second accommodation space, a disposing position of the vibration motors in the first accommodation space and a disposing position of the vibration motors in the second accommodation space may be symmetrical with respect to a rotation axis of a rotation mechanism.

According to a second aspect, a vibration motor is provided. The vibration motor includes a housing, and one end of the housing is opened to form an opening.

When the vibration motor provided in this application is used in a terminal device, the vibration motor may be disposed on a side that is of a first middle frame and that is away from a first screen, the opening of the housing of the vibration motor faces the first middle frame, and an edge of the housing at the opening is fastened to the first middle frame. In this way, the opening on the housing of the vibration motor is blocked by using the first middle frame, to form a closed housing, thereby achieving a waterproof and dustproof protection function to some extent. In addition, the first middle frame forms a wall plate of the housing of the vibration motor. Without changing a height of internal accommodation space of the vibration motor, a height of the vibration motor can be reduced, to reduce a mounting height of the vibration motor in the terminal device. This helps reduce a thickness of the terminal device. Because the height of the internal accommodation space of the vibration motor is unchanged, a design height of a structure such as a mass block in the housing does not need to be limited, so that performance of the vibration motor can be ensured.

In a possible implementation of the second aspect, the housing includes a top wall and a side frame, the side frame is disposed around a circumference of the top wall, and an end that is of the side frame and that is away from the top wall surrounds the opening. The structure of the housing is simple, and the top wall and the side frame may be formed integrally by using a stamping process. In some other embodiments, the top wall and the side frame may be formed separately and assembled together. This can facilitate assembly of an internal structure.

In a possible implementation of the second aspect, a connection lug is disposed on an outer surface of the side frame, the connection lug includes a fastening part, a lug part, and a connection hole, the fastening part is fastened to the outer surface of the side frame, the lug part is fastened to the fastening part, the connection hole is disposed in the lug part, and an axial direction of the connection hole is consistent with an extension direction of a central axis of the opening. This structure is simple, and can implement a detachable connection between the edge of the housing at the opening and the first middle frame, to facilitate repair and replacement.

In a possible implementation of the second aspect, a removable dustproof structure covers the opening. This can avoid a problem of jamming and rusting of the vibration motor caused when dust enters the vibration motor during transportation, storage, and sale of the vibration motor.

In a possible implementation of the second aspect, the dustproof structure is gummed paper. The gummed paper has low costs and high removal efficiency, and is easy to operate. In addition, the gummed paper has specific waterproof performance, and can prevent moisture from entering the vibration motor.

DESCRIPTION OF EMBODIMENTS

Figure 1:
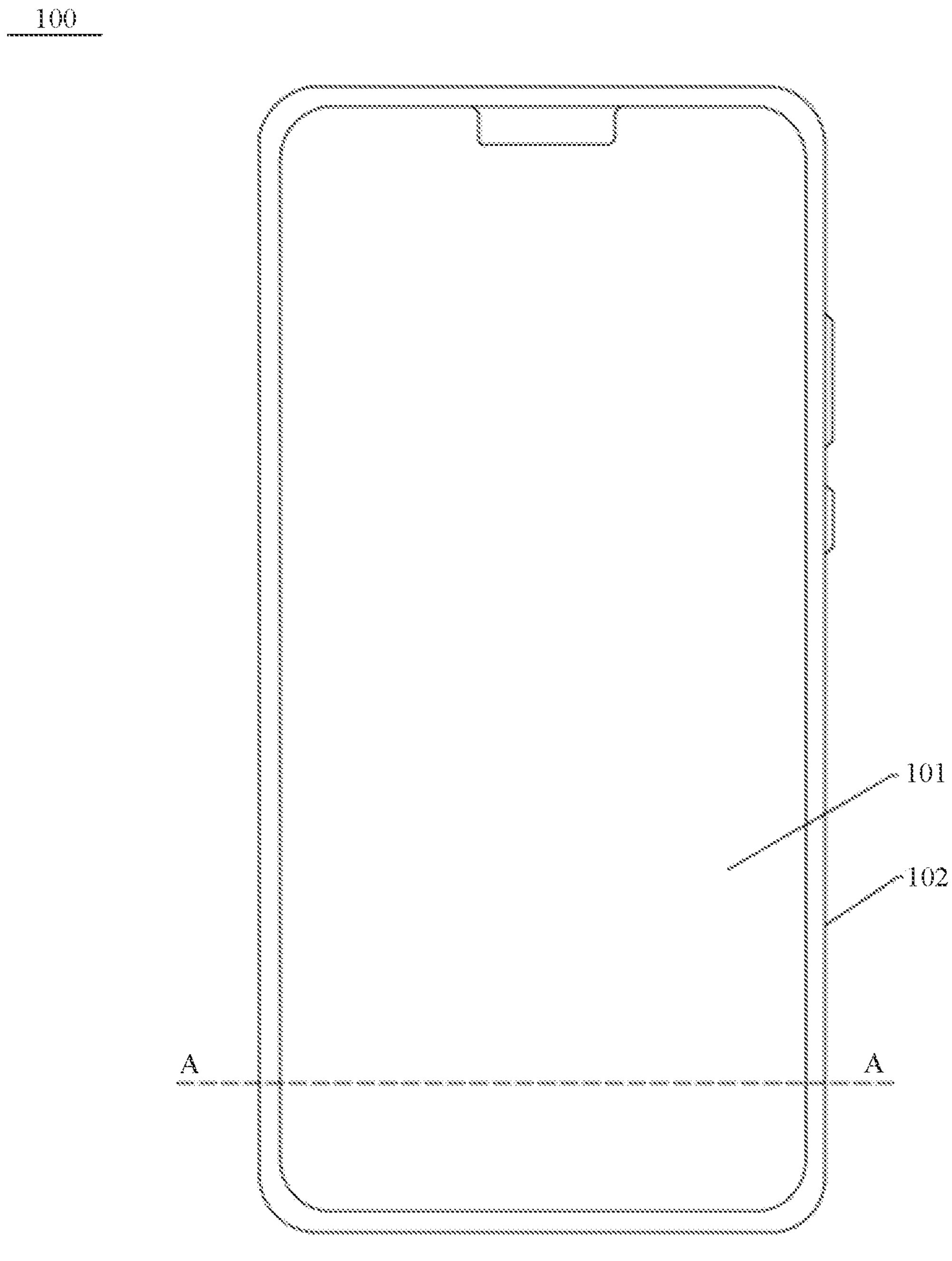
FIG. 1 is a schematic diagram of a structure of a terminal device according to some embodiments of this application.

In embodiments of this application, the terms "first" and "second" are merely used for description, but should not be understood as indicating or implying relative importance or implying a quantity of indicated technical features. Therefore, a feature limited by "first" or "second" may explicitly or implicitly include one or more features.

In embodiments of this application, the term "include", "have", or any other variant thereof is intended to cover non-exclusive inclusion, so that a process, method, article, or apparatus that includes a series of elements includes not only those elements but also other elements that are not explicitly listed, or includes elements inherent to such a process, method, article, or apparatus. In a case without more restrictions, for an element limited by the statement "include a . . . ", a process, method, article, or apparatus that includes the element may further include another same element.

In embodiments of this application, position relationship qualifiers such as the terms "parallel", "perpendicular", "consistent", and "opposite" all indicate approximate positions that allow a specific error.

This application provides a terminal device, and the terminal device has a display interface and can display a video or an image. In addition, a vibration motor is disposed in the terminal device, and can vibrate to implement functions such as an incoming call, message, SMS message, weather, or news reminder and a tactile feedback of a touch or an accidental touch. To overcome a technical bottleneck that a vibration motor limits further thinning of a terminal device, in this application, a middle frame in the terminal device is used to form a wall plate of a housing of the vibration motor, to reduce a mounting height of the vibration motor in the terminal device while ensuring internal accommodation space of the vibration motor, so as to reduce a thickness of the terminal device. Because the improvement solution in this application can ensure the internal accommodation space of the vibration motor, a design volume of a structure such as a mass block in the housing does not need to be limited, so that performance of the vibration motor can be ensured. It may be understood that the thickness of the terminal device refers to a size of the terminal device in a direction perpendicular to the display interface.

The terminal device provided in this application includes but is not limited to a tablet terminal and a foldable terminal. The tablet terminal includes but is not limited to a tablet phone, a tablet personal computer (tablet personal computer), a tablet laptop computer (laptop computer), a tablet personal digital assistant (personal digital assistant, PDA), a tablet in-vehicle device, a tablet wearable device, or the like. The foldable terminal includes but is not limited to a foldable phone or a foldable computer.

The following separately uses a tablet phone and a foldable phone as examples to analyze a thinning requirement for the terminal device, and describes how a vibration motor impedes thinning of the terminal device in this requirement.

Figure 2:
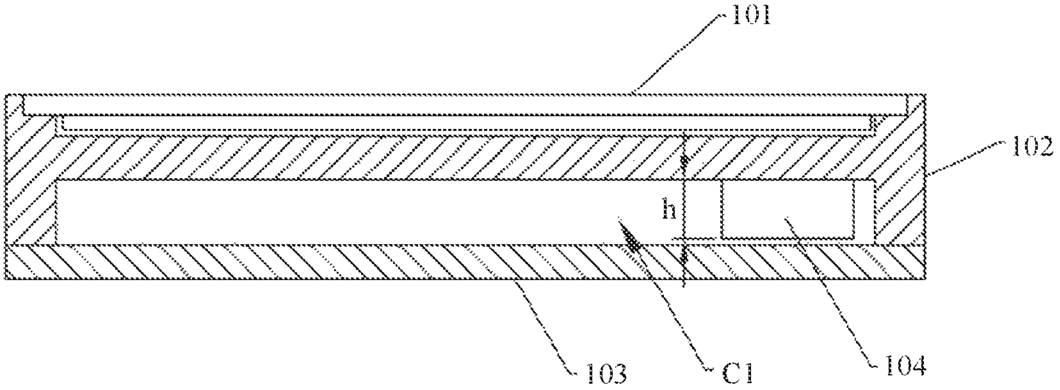
FIG. 2 is a schematic diagram of a cross-sectional structure of the terminal device in FIG. 1 on a line A-A.

FIG. 1 is a schematic diagram of a structure of a terminal device according to some embodiments of this application. FIG. 2 is a schematic diagram of a cross-sectional structure of the terminal device in FIG. 1 on a line A-A. In this embodiment, the terminal device is a tablet phone 100. The tablet phone 100 includes a first screen 101, a first middle frame 102, a first back cover 103, and a vibration motor 104. The first screen 101 is located on one side of the first middle frame 102 and is stacked with the first middle frame 102. The first back cover 103 is located on a side that is of the first middle frame 102 and that is away from the first screen 101, and is stacked with the first middle frame 102. First accommodation space C1 is formed between the first back cover 103 and the first middle frame 102. The vibration motor 104 is located in the first accommodation space C1, and the vibration motor 104 is fastened to the first middle frame 102. Specifically, the vibration motor 104 may be glued to the first middle frame 102, or may be fastened to the first middle frame 102 in a manner such as clamping or threaded connection.

To ensure a hand feeling, a texture, and portability of the tablet phone 100, a thickness of the tablet phone 100 needs to be reduced. On a premise that thicknesses of the first screen 101, the first middle frame 102, and the first back cover 103 are fixed, a mounting height h of the vibration motor 104 on the first middle frame 102 is one of bottlenecks that impede further thinning of the tablet phone 100. The mounting height h of the vibration motor 104 on the first middle frame 102 is a height by which an entirety including the vibration motor 104 and a connection structure protrudes from the first middle frame 102. The connection structure is a structure for connecting the vibration motor 104 to the first middle frame 102.

Figure 3:
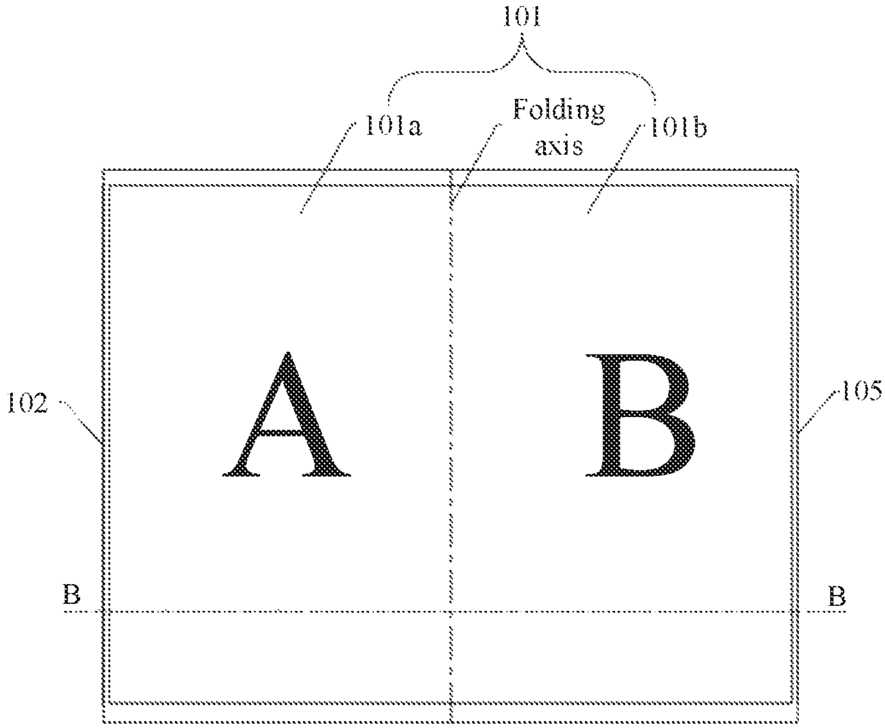
FIG. 3 is a schematic diagram of a structure of a terminal device according to some other embodiments of this application.
Figure 4:
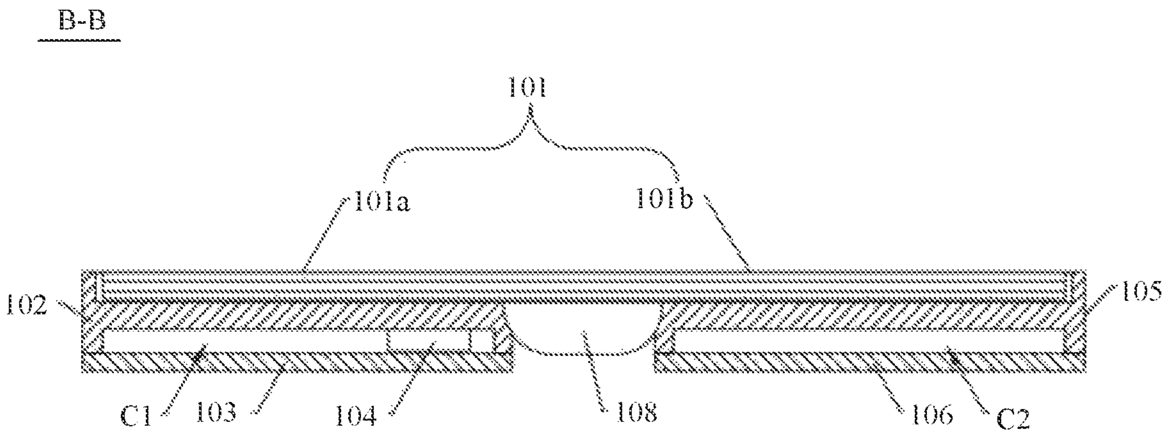
FIG. 4 is a schematic diagram of a cross-sectional structure of the terminal device in FIG. 3 on a line B-B.

FIG. 3 is a schematic diagram of a structure of a terminal device according to some other embodiments of this application. FIG. 4 is a schematic diagram of a cross-sectional structure of the terminal device in FIG. 3 on a line B-B. In this embodiment, the terminal device is a foldable phone 200. In addition to the first screen 101, the first middle frame 102, the first back cover 103, and the vibration motor 104, the foldable phone 200 further includes a second middle frame 105 and a second back cover 106.

The first middle frame 102 is rotatably connected to the second middle frame 105. Specifically, referring to FIG. 4, the first middle frame 102 and the second middle frame 105 may be rotatably connected by using a rotation mechanism 108. There are a plurality of structural forms of the rotation mechanism 108, provided that a rotatable connection between the first middle frame 102 and the second middle frame 105 can be implemented. This is not limited in this application, and details are not described.

The first screen 101 may be folded into a first part 101*a* (that is, a screen A) and a second part 101*b* (that is, a screen B). A folding axis is formed between the first part 101*a* and the second part 101*b*. To enable the first screen 101 to be folded into the first part 101*a* and the second part 101*b*, at least a region in which the folding axis is located on the first screen 101 is made of a flexible material. A remaining region on the first screen 101 may be made of a flexible material, or may be made of a rigid material, or may be partially made of a rigid material and partially made of a flexible material. This is not specifically limited herein. In some embodiments, the entire first screen 101 is made of a flexible material. In this way, manufacturing is convenient and costs are relatively low. However, a screen made of the flexible material is easily scratched.

The first part 101*a* is located on one side of the first middle frame 102 and is stacked with the first middle frame 102. The second part 101*b* is located on one side of the second middle frame 105 and is stacked with the second middle frame 105.

The second back cover 106 is located on a side that is of the second middle frame 105 and that is away from the second part 101*b*, and is stacked with the second middle frame 105. Second accommodation space C2 is formed between the second back cover 106 and the second middle frame 105. The second accommodation space C2 is configured to accommodate structures such as a battery, a main board, and a camera module.

The foldable phone 200 can change between an unfolded state and a folded state. The foldable phone 200 may be classified into two types based on folding directions from the unfolded state to the folded state. One type is a foldable phone that is folded inward (briefly referred to as an inward-foldable phone below), and the other type is a foldable phone that is folded outward (briefly referred to as an outward-foldable phone below). When the inward-foldable phone is in a folded state, the first part 101*a* and the second part 101*b* face each other. When the outward-foldable phone is in a folded state, the first part 101*a* and the second part 101*b* back onto each other.

Figure 5:
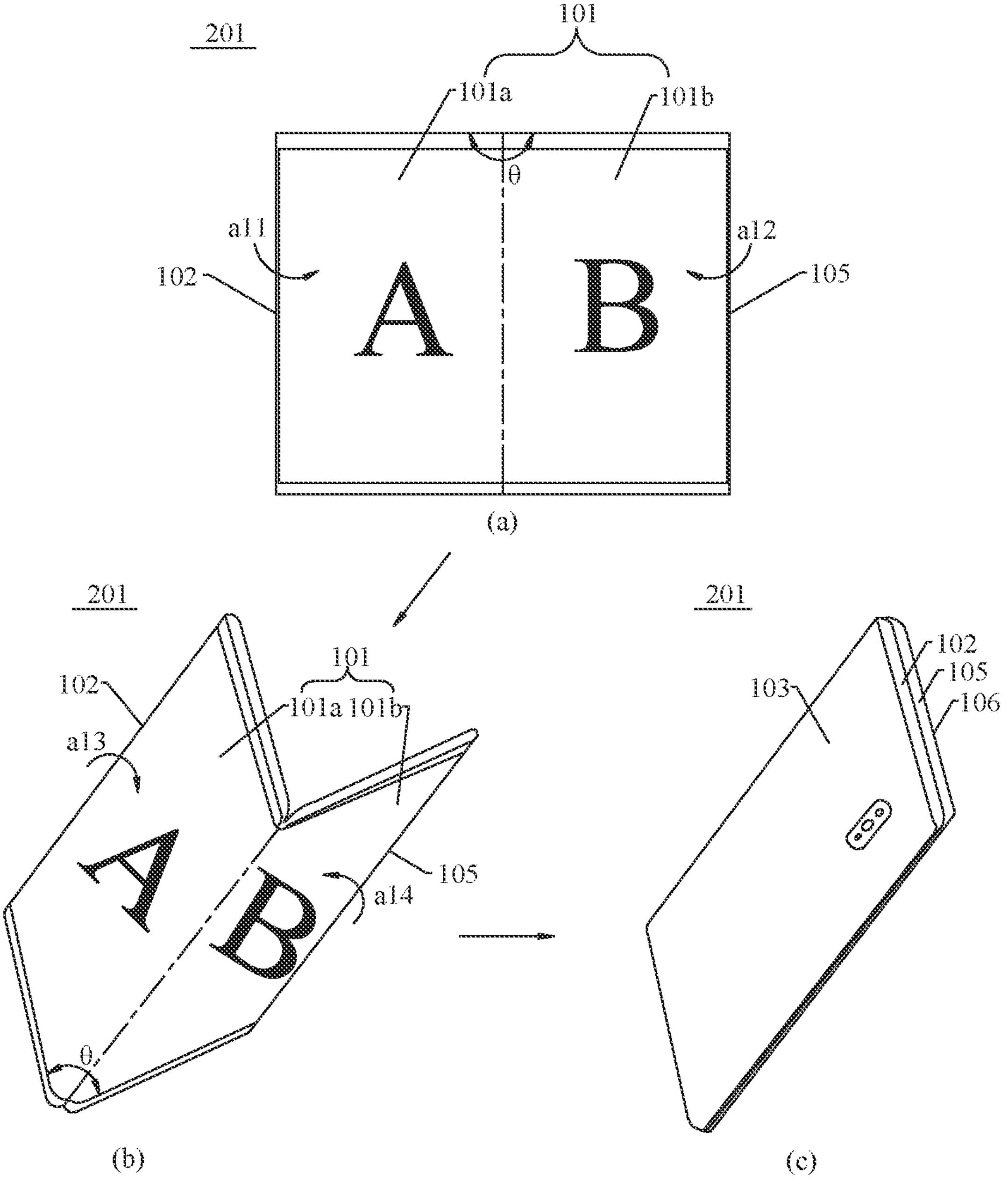
FIG. 5 is a schematic diagram of a structure of an inward-foldable phone during folding from an unfolded state to a folded state according to some embodiments of this application, where (a) in FIG. 5 is a schematic diagram of a structure of the inward-foldable phone in the unfolded state, (b) in FIG. 5 is a schematic diagram of a structure of the inward-foldable phone in a half-folded state, and (c) in FIG. 5 is a schematic diagram of a structure of the inward-foldable phone in the folded state.

FIG. 5 is a schematic diagram of a structure of an inward-foldable phone 201 during folding from an unfolded state to a folded state according to some embodiments of this application. Specifically, (a) in FIG. 5 is a schematic diagram of a structure of the inward-foldable phone in the unfolded state. In this state, the first part 101*a* (that is, the screen A) and the second part 101*b* (that is, the screen B) face or approximately face a same side. In addition, in this state, an included angle θ between the first part 101*a* and the second part 101*b* is 180° or approximately 180°, so that large-screen display can be implemented, to provide more abundant information for a user and bring better use experience to the user.

It should be noted that in descriptions of the foregoing embodiments and the following embodiments, the included angle θ between the first part 101*a* and the second part 101*b* is an included angle between the first part 101*a* and the second part 101*b* on a display side of the first screen 101. The display side of the first screen 101 is a side on which the first screen 101 displays an image or a video. When the user is on the display side of the first screen 101, the user can view an image or a video displayed on the first screen 101.

A schematic diagram of a structure of the inward-foldable phone 201 in a half-folded state shown in (b) in FIG. 5 may be formed by folding two sides of the inward-foldable phone 201 in a direction a11 and a direction a12. In this state, the included angle θ between the first part 101*a* and the second part 101*b* is greater than 0° and less than 180°. Based on this, further, a schematic diagram of a structure of the inward-foldable phone 201 in the folded state shown in (c) in FIG. 5 may be formed by continuing to fold two sides of the inward-foldable phone 201 in a direction a13 and a direction a14. In this state, the foldable phone 201 is completely folded, and the first part 101*a* and the second part 101*b* face each other, that is, the included angle θ between the first part 101*a* and the second part 101*b* is 0° or approximately 0°. In this state, the first screen 101 is invisible to the user. This can prevent the first screen 101 from being scratched by a hard object.

Figure 6:
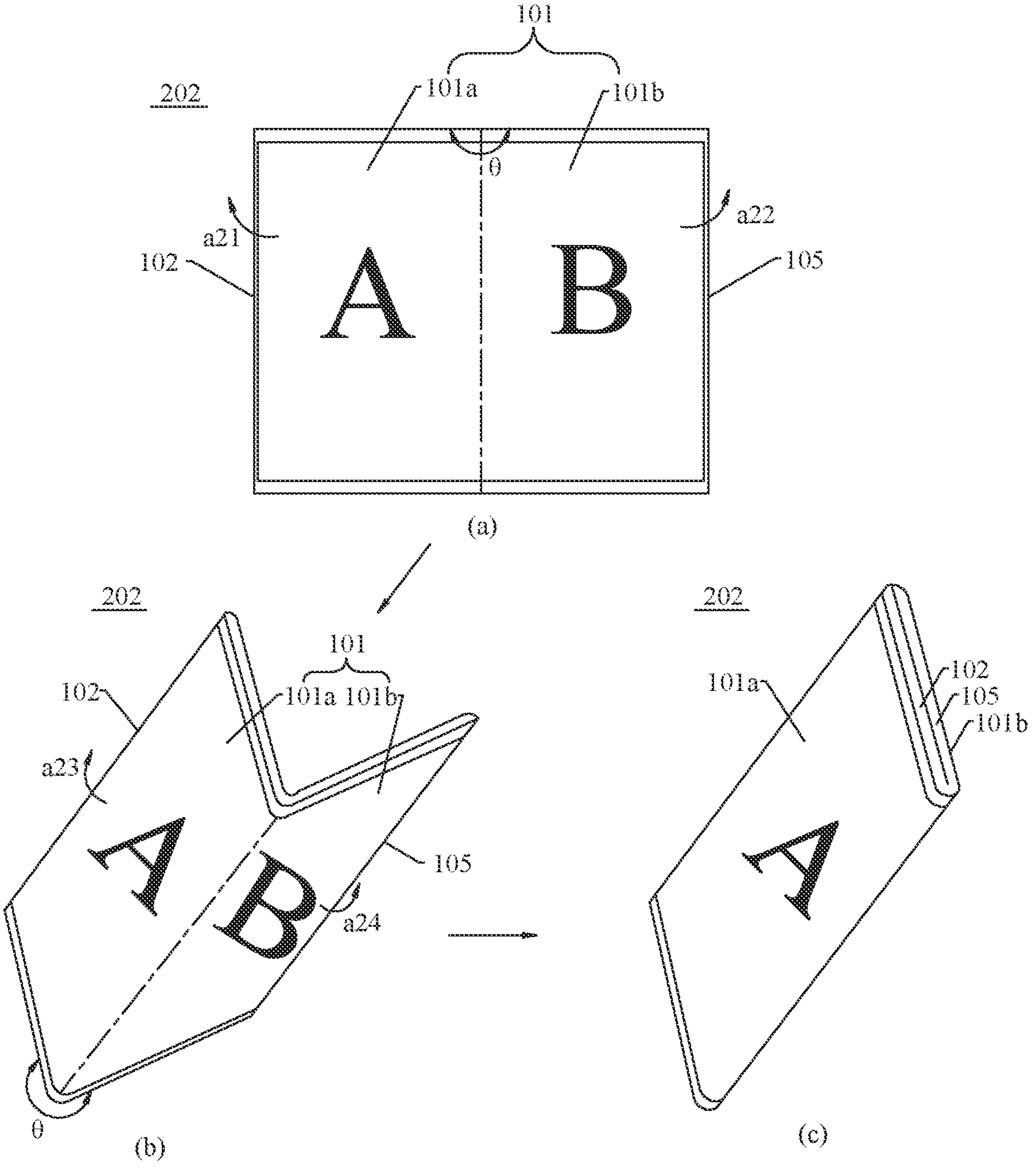
FIG. 6 is a schematic diagram of a structure of an outward-foldable phone during folding from an unfolded state to a folded state according to some embodiments of this application, where (a) in FIG. 6 is a schematic diagram of a structure of the outward-foldable phone in the unfolded state, (b) in FIG. 6 is a schematic diagram of a structure of the outward-foldable phone in a half-folded state, and (c) in FIG. 6 is a schematic diagram of a structure of the outward-foldable phone in the folded state.

FIG. 6 is a schematic diagram of a structure of an outward-foldable phone 202 during folding from an unfolded state to a folded state according to some embodiments of this application. Specifically, (a) in FIG. 6 is a schematic diagram of a structure of the outward-foldable phone 202 in the unfolded state. In this state, the first part 101*a* (that is, the screen A) and the second part 101*b* (that is, the screen B) face or approximately face a same side. In addition, in this state, an included angle θ between the first part 101*a* and the second part 101*b* is 180° or approximately 180°, so that large-screen display can be implemented, to provide more abundant information for a user and bring better use experience to the user. A schematic diagram of a structure of the outward-foldable phone in a half-folded state shown in (b) in FIG. 6 may be formed by folding two sides of the outward-foldable phone 202 in a direction a21 and a direction a22. In this state, the included angle θ between the first part 101*a* and the second part 101*b* is greater than 180° and less than 360°. Based on this, further, a schematic diagram of a structure of the outward-foldable phone 202 in the folded state shown in (c) in FIG. 6 may be formed by continuing to fold two sides of the outward-foldable phone 202 in a direction a23 and a direction a24. In this state, the foldable phone 202 is completely folded, and the first part 101*a* and the second part 101*b* back onto each other, that is, the included angle θ between the first part 101*a* and the second part 101*b* is 360° or approximately 360°. In this state, a volume of the foldable phone is relatively small, and the foldable phone is easy to carry. In addition, small-screen display may be implemented by using one of the first part 101*a* and the second part 101*b*. However, because the first screen 101 is exposed to an external environment, the first screen 101 is prone to be scratched.

It should be noted that FIG. 3 to FIG. 6 all show foldable phones that are folded horizontally. Certainly, the foldable phone in embodiments of this application may alternatively be a foldable phone that is folded vertically. This is not specifically limited herein. In addition, the foldable phone may not be the inward-foldable phone or the outward-foldable phone, but a foldable phone that supports both inward folding and outward folding.

Because a thickness of the foldable phone (including the inward-foldable phone 201, the outward-foldable phone 202, and the foldable phone that supports both inward folding and outward folding) in the folded state is a sum of thicknesses of two folding parts, the thickness of the foldable phone in the folded state is approximately twice the thickness of the tablet phone 100 shown in FIG. 1 and FIG. 2. Therefore, the foldable phone 200 urgently needs to be thinned to improve a hand feeling, a texture, and portability. Therefore, compared with the tablet phone 100, the foldable phone 200 more needs to be thinned by reducing the mounting height of the vibration motor 104 on the first middle frame 102.

Figure 7:
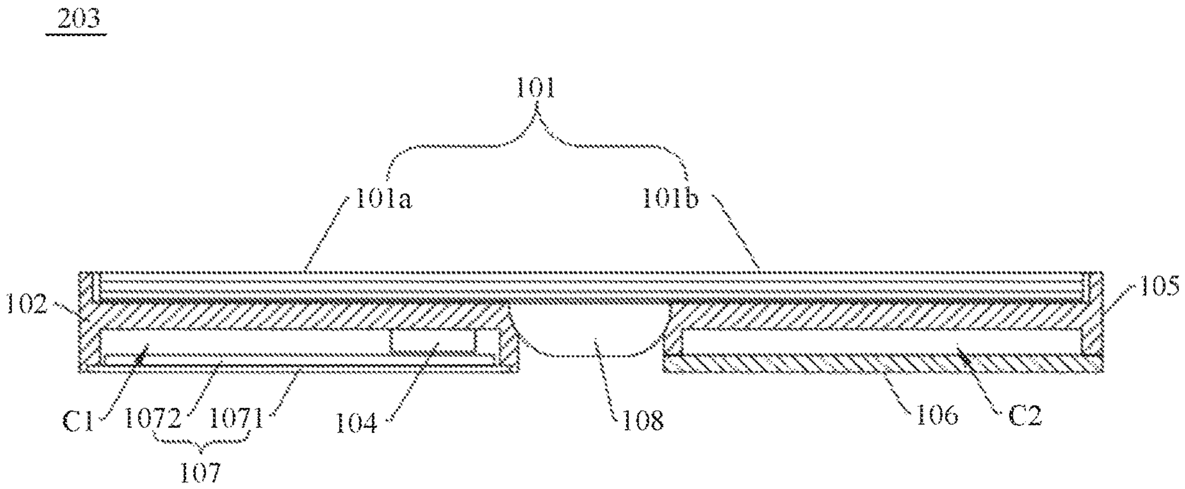
FIG. 7 is a schematic diagram of a cross-sectional structure of a foldable phone according to some other embodiments of this application.

FIG. 7 is a schematic diagram of a cross-sectional structure of a foldable phone 203 according to some other embodiments of this application. In addition to the first screen 101, the first middle frame 102, the vibration motor 104, the second middle frame 105, and the second back cover 106, the foldable phone 203 further includes a second screen 107. The second screen 107 is located on a side that is of the first middle frame 102 and that is away from the first screen 101, and is stacked with the first middle frame 102. First accommodation space C1 is formed between the second screen 107 and the first middle frame 102. The vibration motor 104 is located in the first accommodation space C1, and the vibration motor 104 is fastened to the first middle frame 102.

Figure 8:
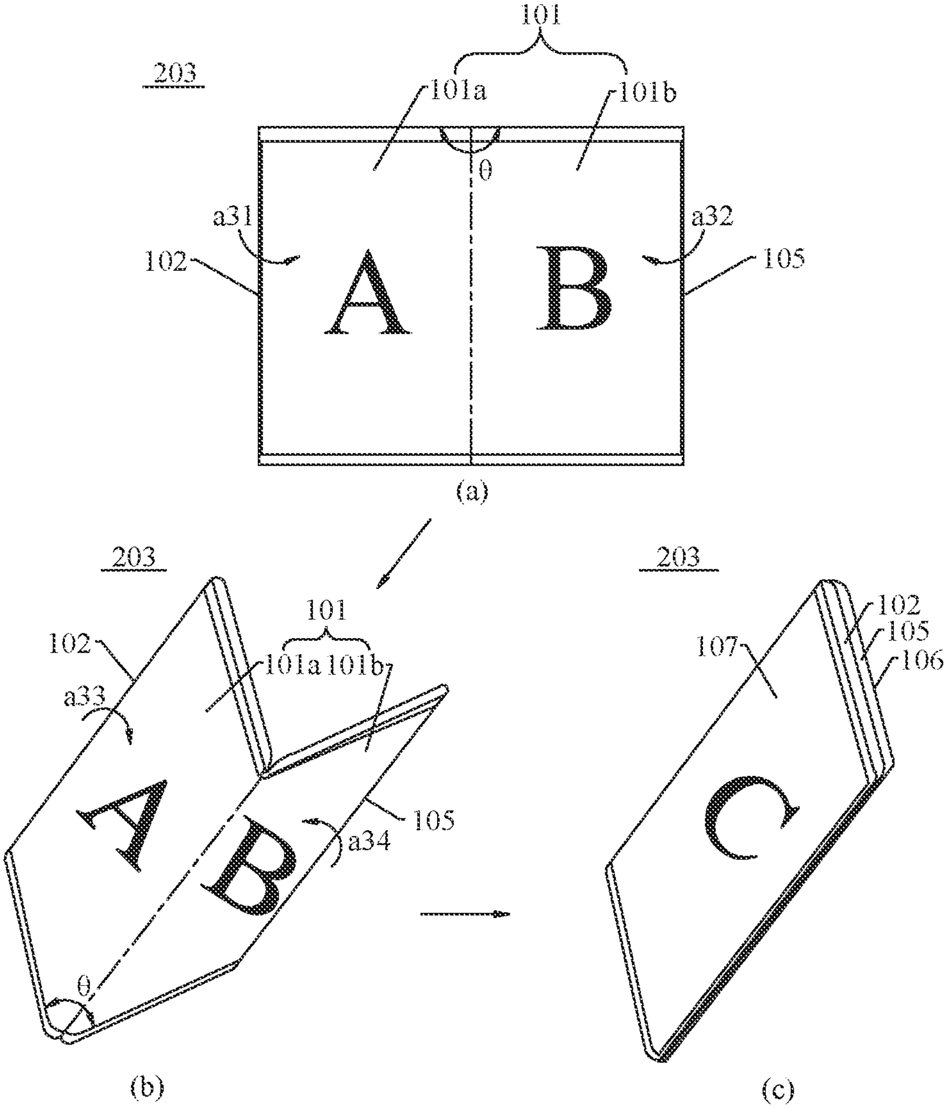
FIG. 8 is a schematic diagram of a structure of the foldable phone in FIG. 7 during folding from an unfolded state to a folded state, where (a) in FIG. 8 is a schematic diagram of a structure of the foldable phone in FIG. 7 in the unfolded state, (b) in FIG. 8 is a schematic diagram of a structure of the foldable phone in FIG. 7 in a half-folded state, and (c) in FIG. 8 is a schematic diagram of a structure of the foldable phone in FIG. 7 in the folded state.

FIG. 8 is a schematic diagram of a structure of the foldable phone 203 in FIG. 7 during folding from an unfolded state to a folded state. Specifically, (a) in FIG. 8 is a schematic diagram of a structure of the foldable phone 203 in the unfolded state. In this state, the first part 101*a* (that is, the screen A) and the second part 101*b* (that is, the screen B) face or approximately face a same side. In addition, in this state, an included angle θ between the first part 101*a* and the second part 101*b* is 180° or approximately 180°, so that large-screen display can be implemented, to provide more abundant information for a user and bring better use experience to the user. A schematic diagram of a structure of the foldable phone 203 in a half-folded state shown in (b) in FIG. 8 may be formed by folding two sides of the foldable phone 203 in a direction a31 and a direction a32. In this state, the included angle θ between the first part 101*a* and the second part 101*b* is greater than 0° and less than 180°. Based on this, further, a schematic diagram of a structure of the foldable phone 203 in the folded state shown in (c) in FIG. 8 may be formed by continuing to fold two sides of the foldable phone 203 in a direction a33 and a direction a34. In this state, the foldable phone 203 is completely folded, and the first part 101*a* and the second part 101*b* face each other, that is, the included angle θ between the first part 101*a* and the second part 101*b* is 0° or approximately 0°. In this state, the first screen 101 is invisible to the user, so that the first screen 101 can be prevented from being scratched by a hard object. In addition, the second screen 107 (that is, a screen C) is exposed, so that small-screen display can be implemented by using the second screen 107.

In the foregoing embodiment, the second screen 107 has scratch resistance performance, to reduce a possibility that the second screen 107 is scratched during small-screen display. For example, referring back to FIG. 7, the second screen 107 includes a transparent cover plate 1071 and a display 1072 (English name: panel, also referred to as a display panel). The transparent cover plate 1071 is stacked with the display 1072. The display 1072 may be a flexible display or a rigid display. For example, the display 1072 may be an organic light-emitting diode (organic light-emitting diode, OLED) display, an active-matrix organic light-emitting diode (active-matrix organic light-emitting diode, AMOLED) display, a mini light-emitting diode (mini organic light-emitting diode) display, a micro light-emitting diode (micro organic light-emitting diode) display, a micro organic light-emitting diode (micro organic light-emitting diode) display, a quantum dot light-emitting diode (quantum dot light-emitting diodes, QLED) display, or a liquid crystal display (liquid crystal display, LCD). The transparent cover plate 1071 is mainly configured to protect the display 1072 and prevent dust, thereby reducing a possibility that the second screen 107 is scratched. A material of the transparent cover plate 1071 includes but is not limited to glass.

It may be understood that, on the premise that scratch resistance performance of the second screen 107 is ensured, the second screen 107 may alternatively use another structural form. Details are not described herein.

On the premise that scratch resistance performance of the second screen 107 is ensured, a thickness of the second screen 107 is usually large. The thickness of the second screen 107 with scratch resistance performance is usually greater than a thickness of the back cover. Specifically, compared with the foldable phone 200 shown in FIG. 4, the foldable phone 203 shown in FIG. 7 is provided with the second screen 107, and the thickness of the second screen 107 is greater than the thickness of the first back cover 103 of the foldable phone 200 shown in FIG. 4. Therefore, the thickness of the foldable phone 203 in FIG. 7 in the folded state is greater than the thickness of the foldable phone 200 in FIG. 4 in the folded state. Therefore, the foldable phone 203 shown in FIG. 7 more urgently needs to be thinned to improve a hand feeling, a texture, and portability. Therefore, compared with the foldable phone 200 shown in FIG. 4, the foldable phone 203 shown in FIG. 7 more needs to be thinned by reducing the mounting height of the vibration motor 104 on the first middle frame 102.

Figure 9:
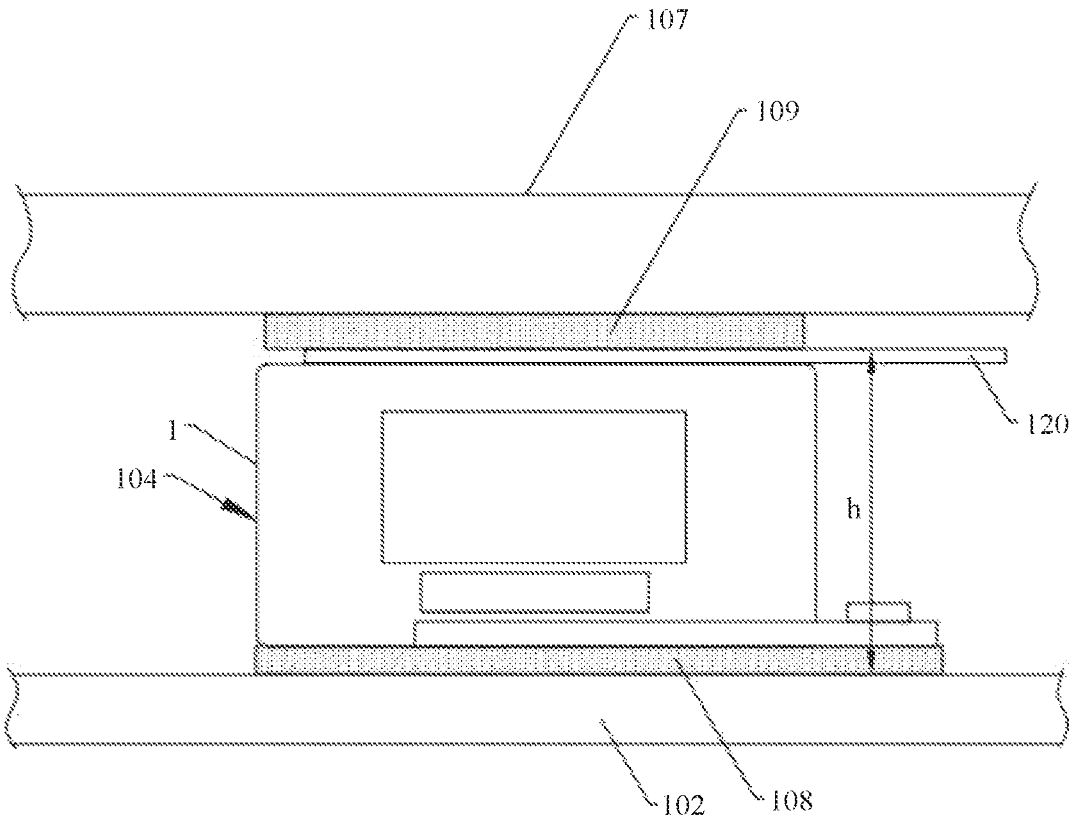
FIG. 9 is a schematic diagram of an assembly structure between a vibration motor and both a first middle frame and a second screen in the foldable phone shown in FIG. 7.

It may be learned from the foregoing description that the mounting height of the vibration motor 104 on the first middle frame 102 is one of the bottlenecks that impede thinning of the tablet phone and the foldable phone (especially the foldable phone with the first screen 101 and the second screen 107). FIG. 9 is a schematic diagram of an assembly structure between the vibration motor 104 and both the first middle frame 102 and the second screen 107 in the foldable phone 203 shown in FIG. 7. The vibration motor 104 includes a housing 1, the housing 1 is a closed housing, and a mass block of the vibration motor 104 is disposed in the housing 1. The housing 1 is sticked to the first middle frame 102 by using an adhesive 108. Based on this, to ensure connection stability of the housing 1 on the first middle frame 102, a limiting structure 120 is further disposed on a side that is of the housing 1 and that is away from the first middle frame 102. The limiting structure 120 is fixedly connected to the first middle frame 102. The limiting structure 120 is configured to prevent the housing 1 from moving in a direction away from the first middle frame 102. Based on this, to avoid falling off or damage of the second screen 107 caused when the vibration motor 104 impacts on the second screen 107 during vibration, a buffer material layer 109 is further disposed between the limiting structure 120 and the second screen 107. The buffer material layer 109 includes but is not limited to foam and rubber. In this embodiment, the mounting height h of the vibration motor 104 on the first middle frame 102 is a sum of the thickness of the adhesive 108, the height of the vibration motor 104, and the thickness of the limiting structure 102, and the mounting height h is relatively large. This is not conducive to thinning of the entire phone.

To resolve the foregoing technical problem, a sinking groove may be disposed on a surface of the first middle frame 102, and a part of the vibration motor 104 is accommodated in the sinking groove, to reduce the mounting height of the vibration motor 104 on the first middle frame 102. However, with development of technologies, as one type of vibration motor 104, a lateral linear motor is widely used in tablet terminal devices and foldable terminal devices. A length and a width of the lateral linear motor are usually large, and an occupation area on the first middle frame 102 is relatively large. If a sinking groove is disposed on the first middle frame 102 to reduce the mounting height of the vibration motor 104, an area of the sinking groove region needs to be large to accommodate the lateral linear motor. However, an increase in the area of the sinking groove region leads to a great decrease in structural strength and reliability of the first middle frame 102.

Figure 10:
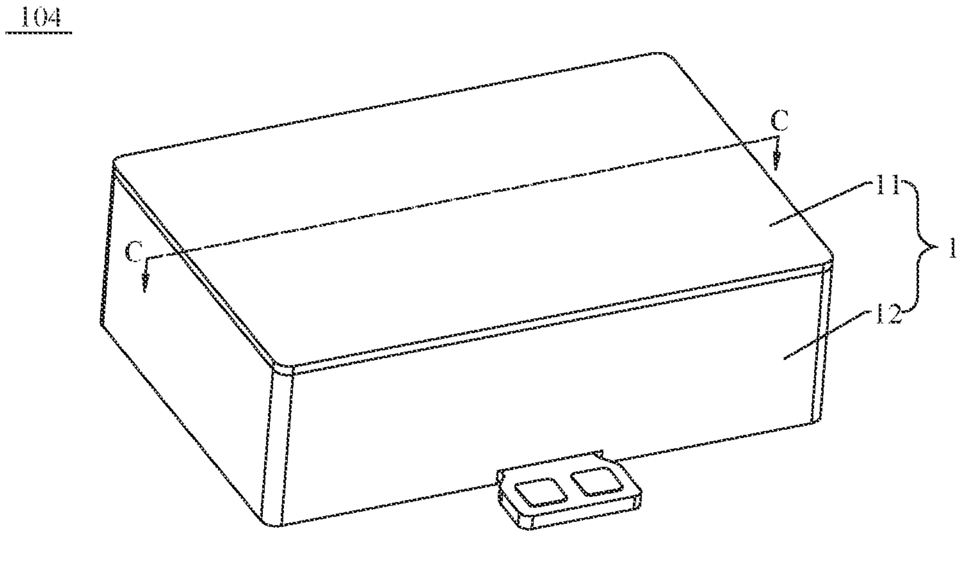
FIG. 10 is a three-dimensional view of a vibration motor according to some embodiments of this application.
Figure 11:
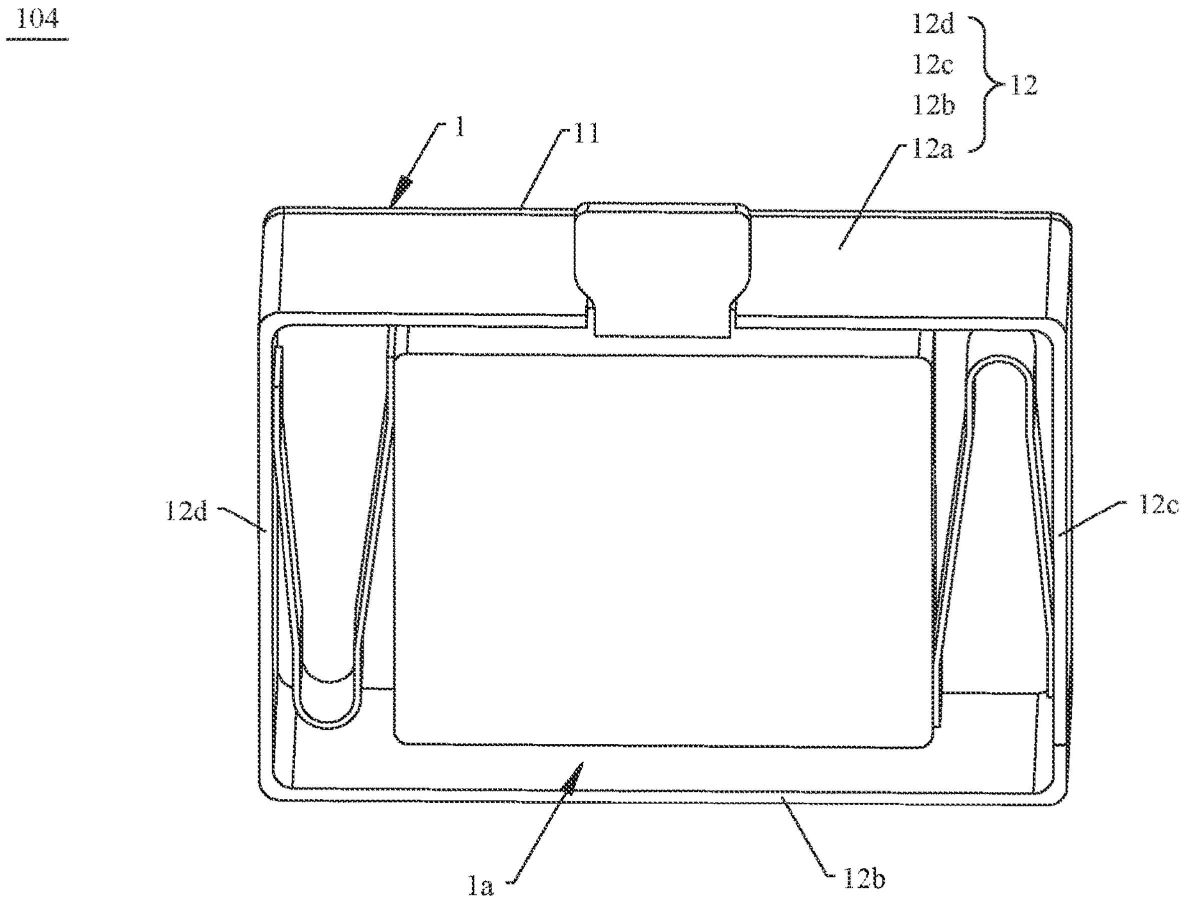
FIG. 11 is a three-dimensional view of the vibration motor in FIG. 10 from bottom to top.
Figure 12:
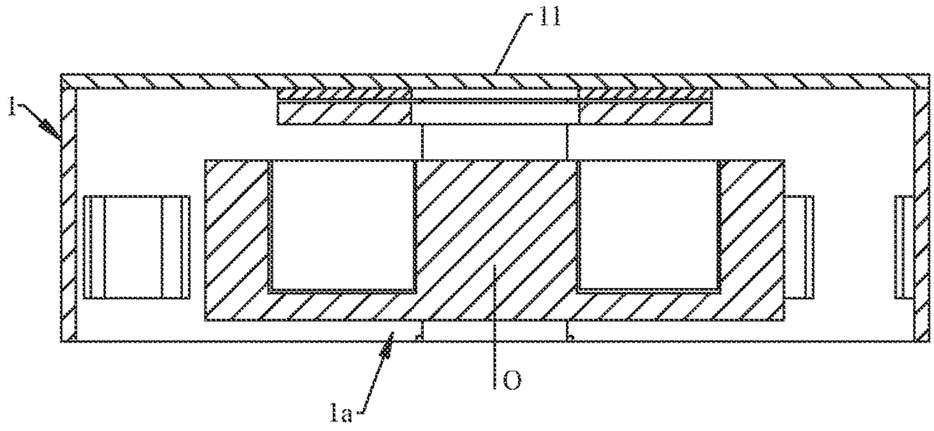
FIG. 12 is a schematic diagram of a cross-sectional structure of the vibration motor in FIG. 10 on a line C-C.

To ensure reliability of the first middle frame 102 and reduce the mounting height of the vibration motor 104 on the first middle frame 102, refer to FIG. 10 to FIG. 12. FIG. 10 is a three-dimensional view of the vibration motor 104 according to some embodiments of this application. FIG. 11 is a three-dimensional view of the vibration motor 104 in FIG. 10 from bottom to top. FIG. 12 is a schematic diagram of a cross-sectional structure of the vibration motor 104 in FIG. 10 on a line C-C. It should be noted that, in this embodiment, "line C-C" refers to a plane on which the line C-C and arrows at two ends of the line C-C are located. Descriptions of similar drawings below should be understood in a same manner, and details are not described below.

The vibration motor 104 can be used in the terminal device in any one of the foregoing embodiments.

Specifically, the vibration motor 104 includes a housing 1, and the housing 1 is configured to perform waterproof and dustproof protection on an internal structure of the vibration motor 104. A material of the housing 1 is metal, for example, stainless steel. In this way, on the premise that structural strength is ensured, a thickness of the housing 1 may be designed to be relatively small, to help reduce a thickness and a volume of the vibration motor 104. In some embodiments, the housing 1 is made of a metal material having magnetic shielding performance. In this way, the housing 1 can prevent a magnetic field inside the vibration motor 104 from affecting performance of an antenna located around the vibration motor 104 in the terminal device.

One end of the housing 1 is opened to form an opening 1*a*. In some embodiments, referring to FIG. 10, the housing 1 includes a top wall 11 and a side frame 12, and the side frame 12 is disposed around a circumference of the top wall 11. Optionally, referring to FIG. 11, the side frame 12 includes a first side wall 12*a* and a second side wall 12*b* that are disposed opposite each other, and a third side wall 12*c* and a fourth side wall 12*d* that are disposed opposite each other. The side frame 12 is formed by sequentially connecting the first side wall 12*a*, the third side wall 12*c*, the second side wall 12*b*, and the fourth side wall 12*d*. The opening 1*a* is surrounded by an end that is of the side frame 12 and that is away from the top wall 11. Specifically, referring to FIG. 11, the opening 1*a* is surrounded by an end that is of the first side wall 12*a* and that is away from the top wall 11, an end that is of the second side wall 12*b* and that is away from the top wall 11, an end that is of the third side wall 12*c* and that is away from the top wall 11, and an end that is of the fourth side wall 12*d* and that is away from the top wall 11. The structure of the housing is simple, and the top wall 11 and the side frame 12 may be formed integrally by using a stamping process. In some other embodiments, the top wall 11 and the side frame 12 may be formed separately and assembled together. This can facilitate assembly of an internal structure.

When the vibration motor 104 is used in the terminal device described in any one of the foregoing embodiments, the opening 1*a* is opposite the first middle frame 102, and an edge of the housing 1 at the opening 1*a* is fastened to the first middle frame 102.

In this way, when the vibration motor 104 is used in the terminal device, the opening 1*a* of the vibration motor 104 may be blocked by using the first middle frame 102, to form a closed housing, thereby achieving a waterproof and dustproof protection function to some extent. In addition, the first middle frame 102 forms a wall plate of the housing 1 of the vibration motor 104. Without changing a height of internal accommodation space of the vibration motor 104, a height of the vibration motor 104 can be reduced, to reduce a mounting height of the vibration motor 104 in the terminal device. This helps reduce a thickness of the terminal device. Because the height of the internal accommodation space of the vibration motor 104 is unchanged, a design height of a structure such as a mass block in the housing 1 does not need to be limited, so that performance of the vibration motor 104 can be ensured.

There are a plurality of fastening manners between the edge of the housing 1 at the opening 1*a* and the first middle frame 102.

Figure 13:
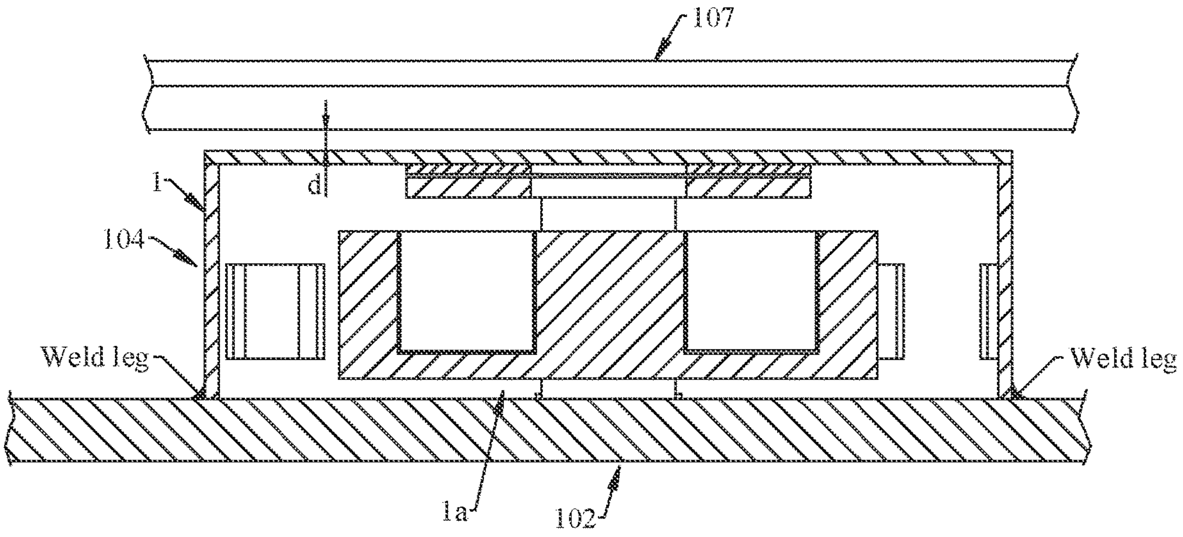
FIG. 13 is a schematic diagram of a relative position between the vibration motor shown in FIG. 10 to FIG. 12 and both a first middle frame and a second screen when the vibration motor is used in the foldable phone shown in FIG. 7.

For example, FIG. 13 is a schematic diagram of a relative position between the vibration motor 104 shown in FIG. 10 to FIG. 12 and both the first middle frame 102 and the second screen 107 when the vibration motor is used in the foldable phone 203 shown in FIG. 7. In this embodiment, the edge of the housing 1 at the opening 1*a* is welded to the first middle frame 102. A weld leg is located at an included angle between an outer surface of the edge of the housing at the opening 1*a* and the first middle frame 102. Stability of welding is relatively high, so that connection stability of the vibration motor 104 on the first middle frame 102 can be improved. In addition, neither of a limiting structure and a buffer material layer needs to be disposed on a side that is of the housing 1 and that is away from the first middle frame 102, so that a mounting height of the vibration motor 104 on the first middle frame 102 can be reduced to some extent.

Figure 14:
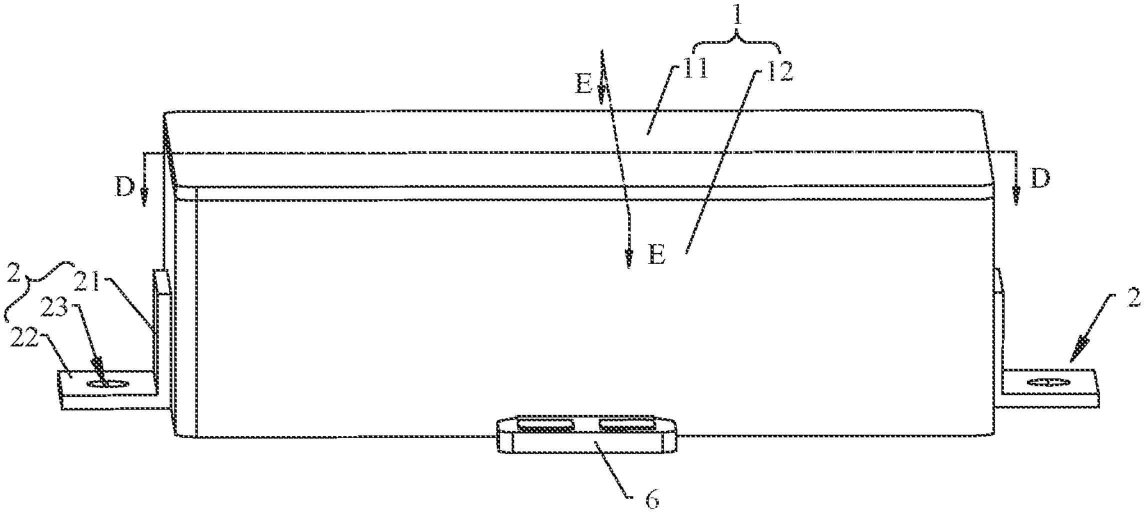
FIG. 14 is a three-dimensional view of a vibration motor according to some other embodiments of this application.
Figure 15:
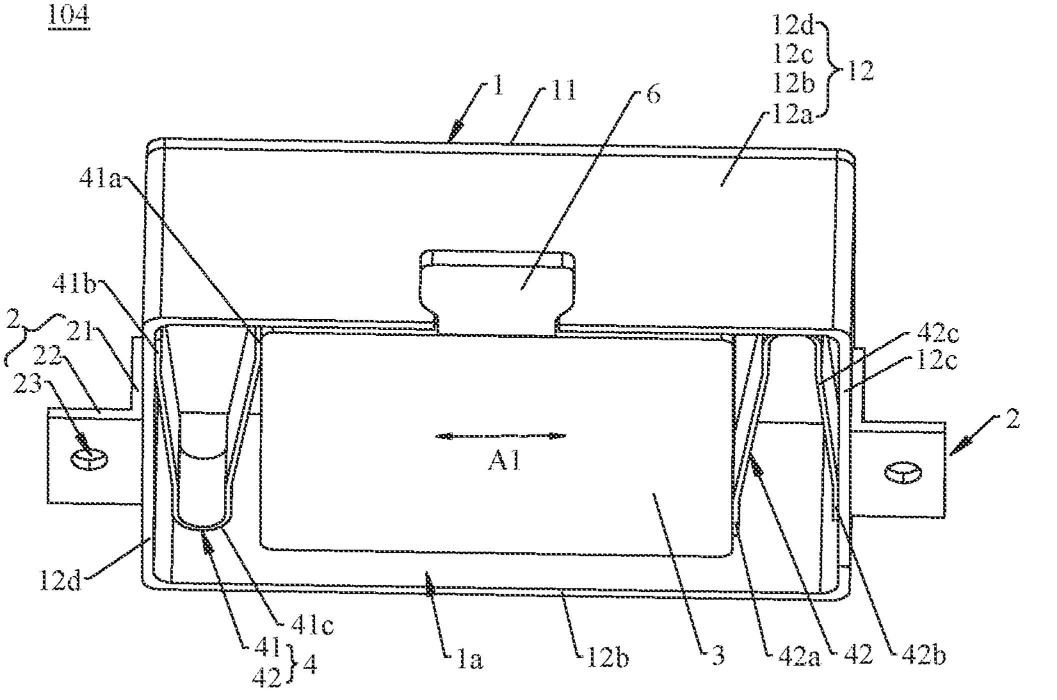
FIG. 15 is a three-dimensional view of the vibration motor in FIG. 14 from bottom to top.
Figure 16:
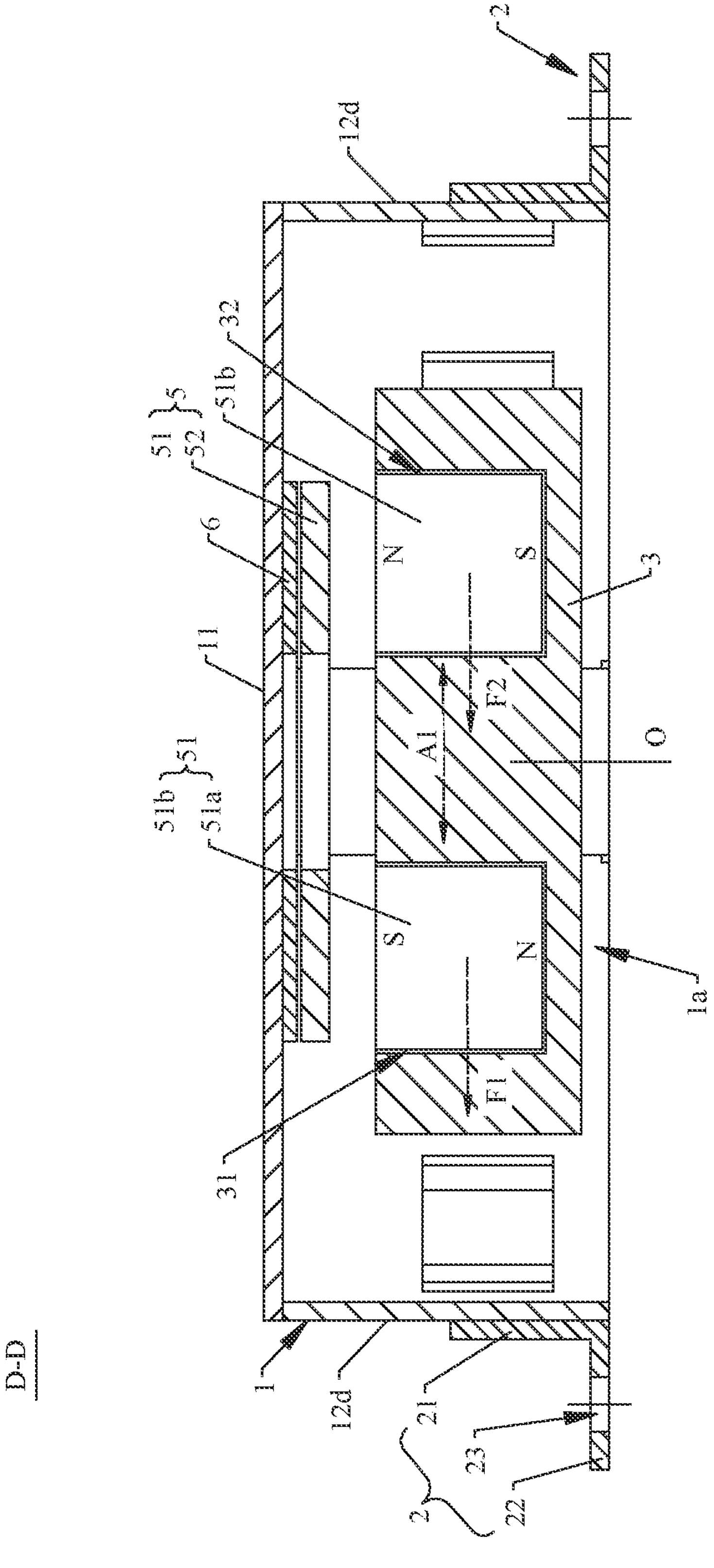
FIG. 16 is a schematic diagram of a cross-sectional structure of the vibration motor in FIG. 14 on a line D-D.

For another example, refer to FIG. 14 to FIG. 16. FIG. 14 is a three-dimensional view of the vibration motor 104 according to some other embodiments of this application. FIG. 15 is a three-dimensional view of the vibration motor 104 in FIG. 14 from bottom to top. FIG. 16 is a schematic diagram of a cross-sectional structure of the vibration motor 104 in FIG. 14 on a line D-D. In this embodiment, a connection lug 2 is disposed on an outer surface of the side frame 12 of the housing 1. The edge of the housing 1 at the opening 1*a* is fastened to the first middle frame 102 by using the connection lug 2. There is at least one connection lug 2. Specifically, there may be one, two, three, four, or more connection lugs 2. In the embodiments shown in FIG. 14 to FIG. 16, there are two connection lugs 2, and the two connection lugs 2 are respectively disposed on outer surfaces of two opposite side walls of the side frame 12. Specifically, referring to FIG. 15, the two connection lugs 2 are respectively disposed on an outer surface of the third side wall 12*c* and an outer surface of the fourth side wall 12*d*. In some other embodiments, the two connection lugs 2 may be disposed on an outer surface of the first side wall 12*a* and an outer surface of the second side wall 12*b*. Because the two connection lugs 2 have a same structure, the following uses only one of the connection lugs 2 as an example to describe a structure of the connection lug 2. Specifically, referring to FIG. 14 to FIG. 16, the connection lug 2 includes a fastening part 21, a lug part 22, and a connection hole 23. The fastening part 21 is welded to the outer surface of the side frame 12. In some other embodiments, the fastening part 21 may alternatively be sticked or clamped to the outer surface of the side frame 12, or the fastening part 21 and the side frame 12 are an integral structure. The lug part 22 is fastened to the fastening part 21. The lug part 22 and the fastening part 21 are an integral structure, that is, the lug part 22 and the fastening part 21 are an entire structure. In some other embodiments, the lug part 22 and the fastening part 21 may be formed separately and fastened together in a welding manner or the like. The connection hole 23 is disposed on the lug part 22, and an axial direction of the connection hole 23 is consistent with an extension direction of a central axis (that is, an axis O in FIG. 16) of the opening 1*a*. The central axis of the opening 1*a* is an axis that passes through the center of the opening 1*a* and is perpendicular to the plane on which the opening 1*a* is located. The structure of the connection lug 2 is simple, and can implement a detachable connection between the edge of the housing 1 at the opening 1*a* and the first middle frame 102, to facilitate repair and replacement of the vibration motor 104. It should be noted that, when the edge of the housing 1 at the opening 1*a* is fastened to the first middle frame 102, the structure of the connection lug 2 may alternatively be another structure, for example, a buckle structure.

Figure 17:
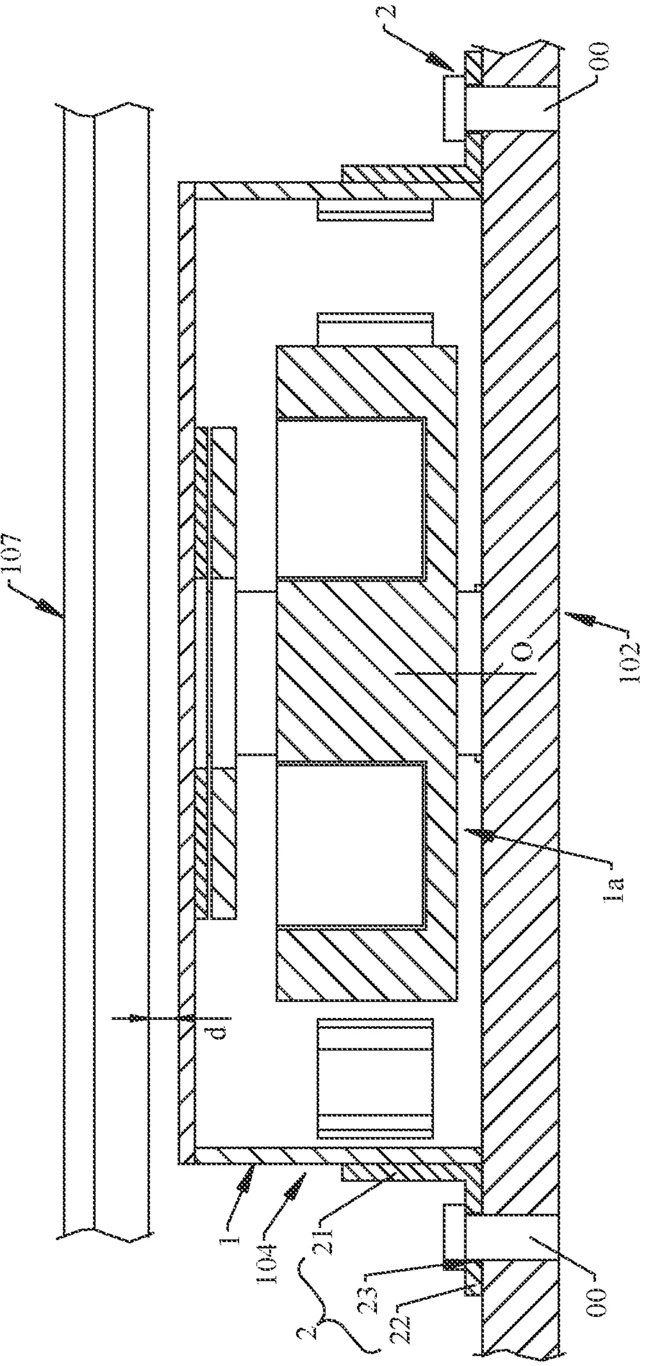
FIG. 17 is a schematic diagram of a relative position between the vibration motor shown in FIG. 14 to FIG. 16 and both a first middle frame and a second screen when the vibration motor is used in the foldable phone shown in FIG. 7.

FIG. 17 is a schematic diagram of a relative position between the vibration motor 104 shown in FIG. 14 to FIG.

16 and both the first middle frame 102 and the second screen 107 when the vibration motor is used in the foldable phone 203 shown in FIG. 7. In this embodiment, the edge of the housing 1 at the opening 1*a* is fastened to the first middle frame 102 by using two connection lugs 2. Specifically, a connection member 00 penetrates the connection hole 23 of the connection lug 2, to fasten the connection lug 2 to the first middle frame 102. The connection member 00 includes but is not limited to a screw, a rivet, or a bolt. Stability and reliability of this connection manner are relatively high, and neither of a limiting structure and a buffer material layer needs to be disposed on a side that is of the housing 1 and that is away from the first middle frame 102, so that a mounting height of the vibration motor 104 on the first middle frame 102 can be reduced to some extent. In addition, a region occupied by the connection lug 2 is relatively small, and space is reserved on a side that is of the lug part 22 and that is away from the first middle frame 102, so that other parts around the vibration motor can be accommodated.

On the basis of the foregoing two examples, referring to FIG. 13 or FIG. 17, the vibration motor 104 and the second screen 107 are spaced from each other, and a width d of a gap between the vibration motor 104 and the second screen 107 is greater than or equal to 0.05 millimeters (mm), and is less than or equal to 0.35 mm. In some embodiments, the width d of the gap is greater than or equal to 0.1 mm, and is less than or equal to 0.2 mm. Specifically, the width d of the gap may be 0.1 mm, 0.11 mm, 0.12 mm, 0.13 mm, 0.14 mm, 0.15 mm, 0.16 mm, 0.17 mm, 0.18 mm, 0.19 mm, 0.2 mm, or the like. In this way, the thickness of the foldable phone 203 can be reduced while the vibration motor 104 is prevented from impacting on the second screen 107. Similarly, when the vibration motor 104 is used in the tablet phone 100 shown in FIG. 2 or the foldable phone 200 shown in FIG. 4, the vibration motor 104 and the first back cover 103 are also spaced from each other, and a width of a gap between the vibration motor 104 and the first back cover 103 may also be 0.05 mm to 0.35 mm. In some embodiments, the gap width may also be 0.1 mm to 0.2 mm.

In some other examples, the edge of the housing 1 at the opening 1*a* may be fastened to the first middle frame 102 in a manner such as sticking or clamping. This is not specifically limited herein.

In some embodiments, a waterproof structure may be disposed between the edge of the housing 1 at the opening 1*a* and the first middle frame 102, to improve waterproof performance of the vibration motor 104. The waterproof structure includes but is not limited to a sealant and a sealing ring. The waterproof structure may alternatively be an annular groove disposed on the surface of the first middle frame 102, and the edge of the housing 1 at the opening 1*a* is embedded in the annular groove, so that a path on which moisture enters the housing 1 through the gap can be prolonged, thereby playing a waterproof role.

In some embodiments, the height (that is, a size in a thickness direction of the terminal device) of the vibration motor 104 is less than or equal to 3.0 mm. For example, the height of the vibration motor 104 is 3.0 mm, 2.9 mm, 2.8 mm, 2.7 mm, 2.6 mm, 2.5 mm, or the like. In this way, the height of the vibration motor 104 is relatively small. This facilitates thinning of the terminal device.

An internal structure of the vibration motor 104 shown in FIG. 10 to FIG. 12 is the same as an internal structure of the vibration motor 104 shown in FIG. 14 to FIG. 16. The following uses only the vibration motor 104 shown in FIG. 14 to FIG. 16 as an example to describe the internal structure of the vibration motor 104.

Figure 18:
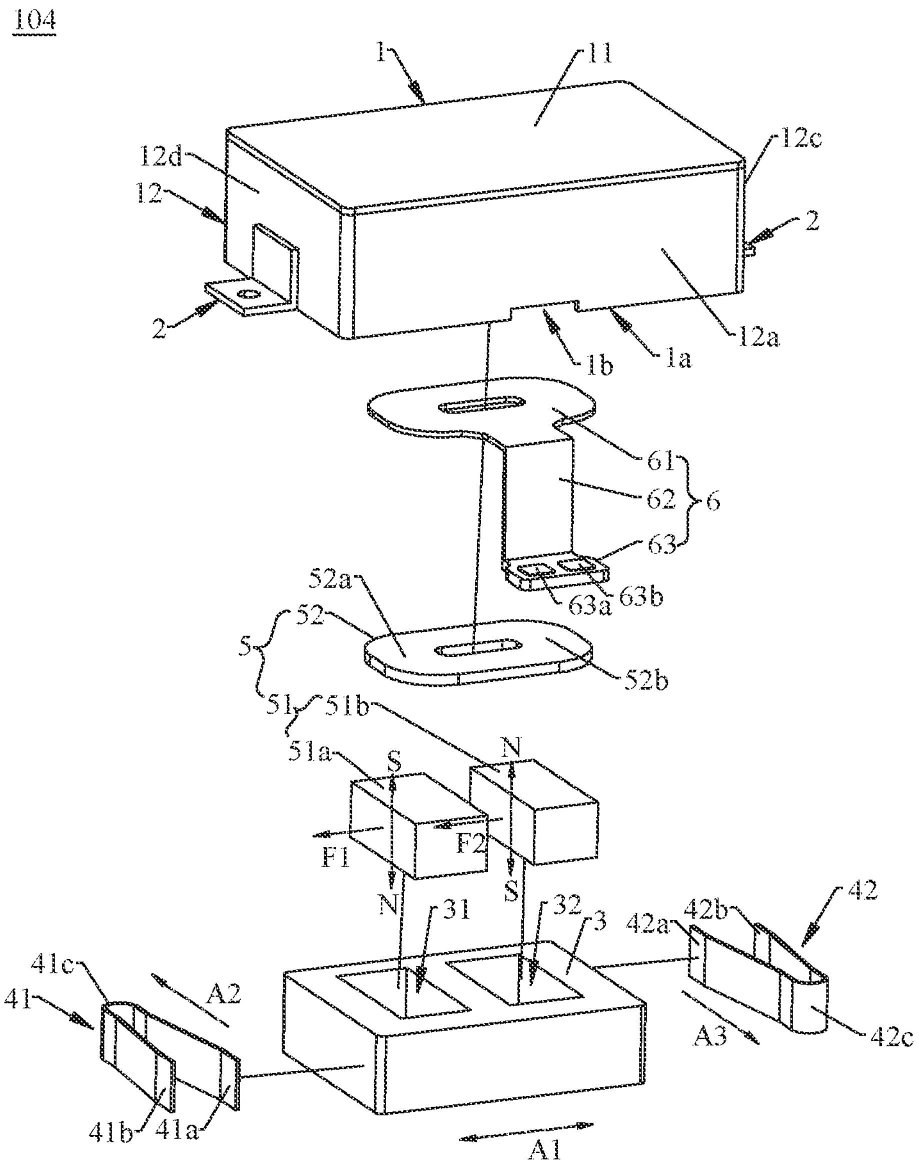
FIG. 18 is an exploded view of the vibration motor shown in FIG. 14.

Specifically, FIG. 18 is an exploded view of the vibration motor 104 shown in FIG. 14. In addition to the housing 1, the vibration motor 104 further includes a mass block 3, an elastic assembly 4, a drive assembly 5, and an electrical connection structure 6.

The mass block 3 is located in the housing 1. The mass block 3 is in a rectangular shape. In some other embodiments, the mass block 3 may alternatively be a cube, a sphere, an ellipsoid, or the like. As a vibration body in the vibration motor 104, the mass block 3 can reciprocally vibrate on a plane parallel to the plane on which the opening 1*a* is located. Specifically, on the plane parallel to the plane on which the opening 1*a* is located, a vibration path of the mass block 3 may be a straight line, or may be a curve. In the embodiment shown in FIG. 18, with reference to FIG. 15 and FIG. 16, a vibration path of the mass block 3 is a straight line. In this way, the vibration motor 104 is a lateral linear motor. When the vibration motor 104 is used in the terminal device, a vibration direction of the mass block 3 is perpendicular to the thickness direction of the terminal device. This helps reduce the mounting height of the vibration motor 104 in the terminal device. In some other embodiments, the vibration direction of the mass block 3 may alternatively be perpendicular to the plane on which the opening 1*a* is located. In this way, the vibration motor 104 is a longitudinal linear motor. When the vibration motor 104 is used in the terminal device, the vibration direction of the mass block 3 is consistent with the thickness direction of the terminal device. In some other embodiments, the vibration motor 104 may alternatively be a rotor motor. The following embodiments are all described on the basis that the vibration motor 104 is a lateral linear motor. This should not be considered as a special limitation on this application.

The elastic assembly 4 is configured to elastically support the mass block 3 in the housing 1, and the elastic assembly 4 allows the mass block 3 to vibrate reciprocally in the housing 1 in a direction A1. In some embodiments, referring to FIG. 18, and with reference to FIG. 15, the elastic assembly 4 includes a first elastic member 41 and a second elastic member 42. Both the first elastic member 41 and the second elastic member 42 are springs. An arrangement direction of the first elastic member 41, the mass block 3, and the second elastic member 42 is parallel to the vibration direction A1 of the mass block 3.

The first elastic member 41 includes a first fastening part 41*a*, a first connection part 41*c*, and a second fastening part 41*b* that are connected in sequence. The first fastening part 41*a* is connected to the mass block 3, and a connection manner includes but is not limited to welding or sticking. The second fastening part 41*b* is connected to the fourth side wall 12*d* of the side frame 12 in the housing 1, and a connection manner includes but is not limited to welding or sticking. The first connection part 41*c* is approximately of an n shape, an arch direction A2 of the first connection part 41*c* is parallel to the plane on which the opening 1*a* is located, and the arch direction A2 of the first connection part 41*c* is perpendicular to the vibration direction A1 of the mass block 3.

The second elastic member 42 includes a third fastening part 42*a*, a second connection part 42*c*, and a fourth fastening part 42*b* that are connected in sequence. The third fastening part 42*a* is connected to the mass block 3, and a connection manner includes but is not limited to welding or sticking. The fourth fastening part 42*b* is connected to the third side wall 12*c* of the side frame 12 in the housing 1, and a connection manner includes but is not limited to welding or sticking. The second connection part 42*c* is approximately of an n shape, and an arch direction A3 of the second connection part 42*c* is opposite to the arch direction A2 of the first connection part 41*c*.

In this way, both the first elastic member 41 and the second elastic member 42 have a capability of deforming in a direction parallel to the vibration direction A1 of the mass block 3. When the mass block 3 vibrates in a direction close to the fourth side wall 12*d*, an included angle between two arms of the first connection part 41*c* decreases, and an included angle between two arms of the second connection part 42*c* increases. When the mass block 3 vibrates in a direction close to the third side wall 12*c*, an included angle between two arms of the first connection part 41*c* increases, and an included angle between two arms of the second connection part 42*c* decreases. This structure is simple and easy to implement.

It should be noted that, when it is ensured that the elastic assembly 4 can elastically support the mass block 3 in the housing 1, and the elastic assembly 4 allows the mass block 3 to reciprocally vibrate in the direction A1 in the housing 1, the elastic assembly 4 may alternatively be designed in another structural form. This is not specifically limited herein.

The drive assembly 5 is configured to drive the mass block 3 to reciprocally vibrate on the plane parallel to the plane on which the opening 1*a* is located. In some embodiments, referring to FIG. 18 and with reference to FIG. 16, the drive assembly 5 includes a magnet assembly 51 and a coil 52. The magnet assembly 51 is fastened to the mass block 3. In some embodiments, a mounting groove (including a first mounting groove 31 and a second mounting groove 32) is disposed on the mass block 3, and the magnet assembly 51 is accommodated and secured in the mounting groove. In some other embodiments, the magnet assembly 51 may alternatively be disposed on an outer surface of the mass block 3. The coil 52 is fastened to the housing 1. In some embodiments, the coil 52 is fastened to the inner surface of the top wall 11. In this way, a support structure of the coil 52 does not need to be additionally disposed. This helps reduce the height of the vibration motor 104. The magnet assembly 51 cooperates with the coil 52 to generate a Lorentz force, and the Lorentz force can drive the mass block 3 to reciprocally vibrate on the plane parallel to the plane on which the opening 1*a* is located.

Specifically, the magnet assembly 51 includes a first magnet 51*a* and a second magnet 1*b*. The first magnet 51*a* is housed in the first mounting groove 31, and the second magnet 51*b* is housed in the second mounting groove 32. The first magnet 51*a* and the second magnet 51*b* may be magnetic iron or magnetic steel. A magnetization direction of the first magnet 51*a* and a magnetization direction of the second magnet 51*b* are both perpendicular to the plane on which the opening 1*a* is located, and the magnetization direction of the first magnet 51*a* is opposite to the magnetization direction of the second magnet 51*b*. The magnetization direction is a direction from the north pole (that is, the N pole) to the south pole (that is, the S pole). For example, referring to FIG. 18 and with reference to FIG. 16, an upper end of the first magnet 51*a* is the S pole and a lower end is the N pole, and an upper end of the second magnet 51*b* is the N pole and a lower end is the S pole. In some other embodiments, the upper end of the first magnet 51*a* may be the N pole and the lower end is the S pole. Based on this, the upper end of the second magnet 51*b* is the S pole and the lower end is the N pole. The coil 52 has a first side 52*a* and a second side 52*b*. Both an extension direction of the first side 52*a* and an extension direction of the second side 52*b* are perpendicular to the direction A1, the first magnet 51*a* is opposite the first side 52*a*, and the second magnet 51*b* is opposite the second side 52*b*. When the coil 52 is powered on, the first magnet 51*a* and the second magnet 51*b* generate Lorentz forces F1 and F2 parallel to the direction A1, and a direction of F1 is the same as a direction of F2. A combined force of F1 and F2 may drive the mass block 3 to move unidirectionally on the plane parallel to the plane on which the opening 1*a* is located. Based on this, reciprocal vibration of the mass block 3 may be driven by current commutation of the coil 52. In some other embodiments, the magnet assembly 51 may alternatively include only one of the first magnet 51*a* and the second magnet 51*b*, and then one of F1 and F2 drives the mass block 3 to move on the plane parallel to the plane on which the opening 1*a* is located.

In some other embodiments, a disposing position of the magnet assembly 51 may be interchangeable with a disposing position of the coil 52. That is, the magnet assembly 51 is disposed on the housing 1, and the coil 52 is disposed on the mass block 3.

Figure 19:
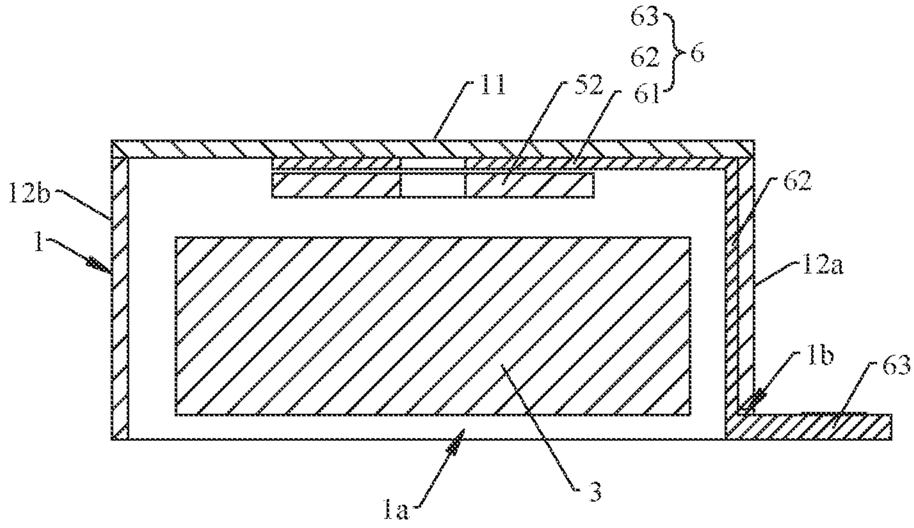
FIG. 19 is a schematic diagram of a cross-sectional structure of the vibration motor in FIG. 14 on a line E-E.

The electrical connection structure 6 is configured to lead an electrode of the coil 52 out of the housing 1. The electrical connection structure 6 includes but is not limited to a printed circuit board (printed circuit board, PCB), a flexible printed circuit (flexible printed circuit board, FPC), and a structure formed by connecting a plurality of wires by using a flexible structure. The electrical connection structure 6 includes a first segment 61, a second segment 62, and a third segment 63 that are sequentially connected. FIG. 19 is a schematic diagram of a cross-sectional structure of the vibration motor 104 in FIG. 14 on a line E-E. With reference to FIG. 16, the first segment 61 is fastened to the inner surface of the top wall 11, and the coil 52 is fastened to the first segment 61 and electrically connected to the first segment 61. The second segment 62 is fastened to the inner surface of the side frame 12. Specifically, the second segment 62 may be fastened to an inner surface of the first side wall 12*a* in the side frame 12. In this way, the first elastic member 41 and the second elastic member 42 can be avoided, to avoid interference between the electrical connection structure 6 and the elastic member 4. In some other embodiments, the second segment 62 may alternatively be fastened to an inner surface of the second side wall 12*b* in the side frame 12. An extension path of the third segment 63 is parallel to the plane on which the opening 1*a* is located, and a part of the third segment 63 is located outside the housing 1. A positive terminal 63*a* and a negative terminal 63*b* are disposed on the part that is of the third segment 63 and that is located outside the housing 1. The electrical connection structure 6 can lead an electrode of the coil 52 to the third segment 63 outside the housing 1, and when the vibration motor 104 is used in the terminal device, the third segment 63 of the electrical connection structure 6 can be fastened and supported by using the first middle frame 102. That is, when the vibration motor 104 is used in the terminal device, the third segment 63 of the electrical connection structure 6 is attached to and fastened to the first middle frame 102. Therefore, the third segment 63 is fastened and supported by using the first middle frame 102.

Based on the foregoing embodiment, optionally, referring to FIG. 18, an avoidance notch 1*b* is disposed at the edge of the housing 1 at the opening 1*a*, and the third segment 63 penetrates into the avoidance notch 1*b*. In this way, the third segment 63 is prevented from being highly overlapped with the housing 1, so that a large gap exists between the edge of the housing 1 at the opening 1*a* and the first middle frame 102, thereby improving waterproof and sealing performance of the vibration motor 104.

There may be one or more vibration motors 104 disposed in the terminal device 100. This is not specifically limited herein. When the terminal device 100 is the foldable terminal device shown in FIG. 4 or FIG. 7, a plurality of vibration motors 104 may all be disposed in the first accommodation space C1 or may all be disposed in the second accommodation space C2, or some vibration motors 104 may be disposed in the first accommodation space C1 and the other vibration motors 104 may be disposed in the second accommodation space C2. When some of a plurality of vibration motors 104 are disposed in the first accommodation space C1 and the other vibration motors 104 are disposed in the second accommodation space C2, a disposing position of the vibration motors in the first accommodation space C1 and a disposing position of the vibration motors in the second accommodation space C2 may be symmetrical with respect to a rotation axis of the rotation mechanism 108. In some other embodiments, the two disposing positions may alternatively be asymmetrical. This is not specifically limited herein.

Figure 20:
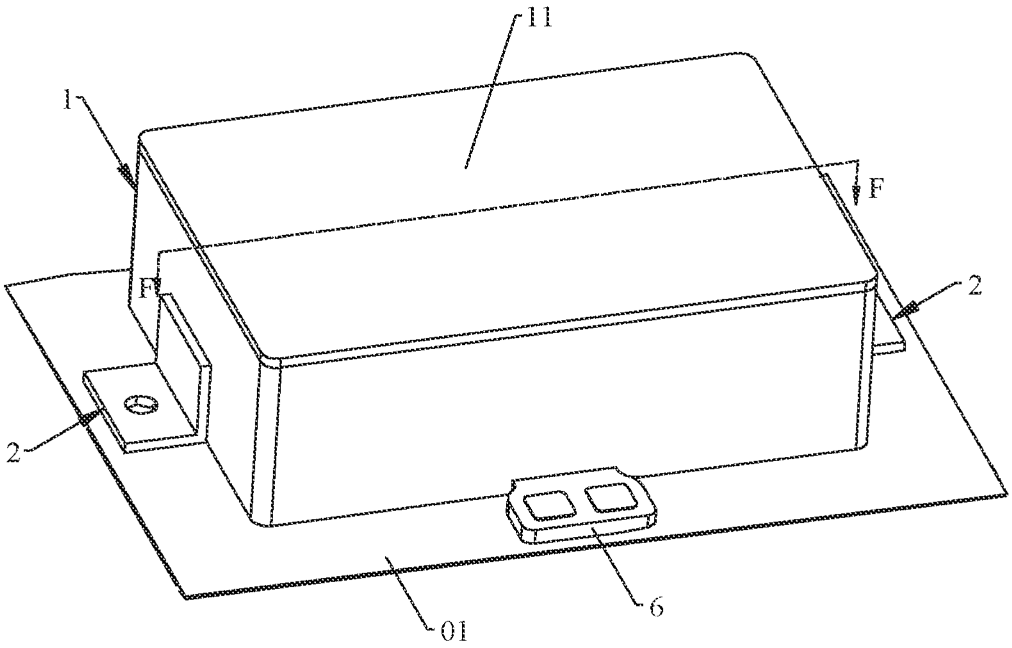
FIG. 20 is a schematic diagram of a structure of a vibration motor according to some other embodiments of this application.
Figure 21:
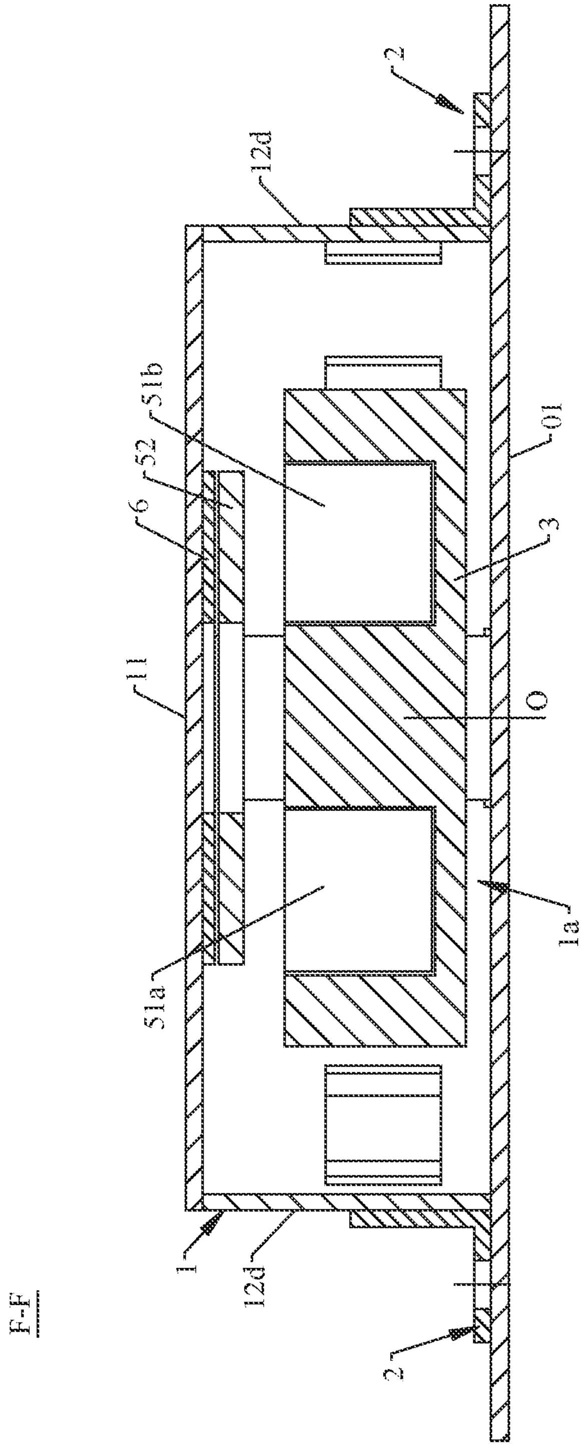
FIG. 21 is a schematic diagram of a cross-sectional structure of the vibration motor in FIG. 20 on a line F-F.

The vibration motor 104 may be sold, stored, transported, or the like as a product structure. Based on this, to avoid a problem of jamming and rusting of the vibration motor 104 caused when dust enters the vibration motor 104 during transportation, storage, and sale, in some embodiments, refer to FIG. 20 and FIG. 21. FIG. 20 is a schematic diagram of a structure of the vibration motor 104 according to some other embodiments of this application. FIG. 21 is a schematic diagram of a cross-sectional structure of the vibration motor 104 in FIG. 20 on a line F-F. A removable dustproof structure 01 is disposed at the opening 1*a*. The dustproof structure 01 includes but is not limited to gummed paper, a steel plate, a plastic board, or the like. The dustproof structure 01 may be sticked to the edge of the housing 1 at the opening 1*a*, or may be disposed at the edge of the housing 1 at the opening 1*a* in a detachable connection manner such as threaded connection or clamping. In some embodiments, the dustproof structure 01 is gummed paper. The gummed paper has low costs and high removal efficiency, and is easy to operate. In addition, the gummed paper has specific waterproof performance, and can prevent moisture from entering the vibration motor 104. Before the vibration motor 104 is assembled to the terminal device, the dustproof structure 01 may be removed.

According to the foregoing description, this application provides a vibration motor and a terminal device with the vibration motor. When a call, a message, or an SMS message is received, the vibration motor can vibrate to prompt a user to view in a timely manner. In addition, when a button displayed on a screen is triggered or is triggered by mistake, the vibration motor can vibrate to implement a tactile feedback.

In the description of this specification, specific features, structures, materials, or characteristics may be combined in an appropriate manner in any one or more embodiments or examples.

Finally, it should be noted that the foregoing embodiments are merely used to describe the technical solutions of this application, but not limit the technical solutions of this application. Although this application is described in detail with reference to the foregoing embodiments, persons of ordinary skill in the art should understand that they may still modify the technical solutions described in the foregoing embodiments, or perform equivalent replacement on some technical features thereof. However, these modifications or replacements do not make the essence of the corresponding technical solutions depart from the spirit and scope of the technical solutions in embodiments of this application.

What is claimed is:

1. A terminal device, comprising:
a first screen;
a first middle frame, wherein at least a part of the first screen is located on a first side of the first middle frame and is stacked with the first middle frame; and
a vibration motor located on a second side of the first middle frame that is away from the first side, wherein the vibration motor comprises a housing, one end of the housing is opened to form an opening, the opening faces the first middle frame, and an edge of the housing at the opening is fastened to the first middle frame,
wherein the housing comprises:
a top wall; and
a side frame disposed around a circumference of the top wall, wherein an end of the side frame that is away from the top wall surrounds the opening,
wherein the vibration motor further comprises:
a mass block disposed in the housing, wherein the mass block is configured to reciprocally vibrate relative to the housing on a plane parallel to a plane on which the opening is located; and
a drive assembly, comprising:
a magnet assembly fastened to the mass block; and
a coil located between the mass block and the top wall, wherein the coil is fastened to the top wall, the magnet assembly cooperates with the coil to generate a Lorentz force, and the Lorentz force is configured to drive the mass block to reciprocally vibrate relative to the housing on the plane parallel to the plane on which the opening is located.

2. The terminal device of claim 1, wherein the vibration motor further comprises an electrical connection structure, comprising:
a first segment fastened to an inner surface of the top wall, and fastened to and electrically connected to the coil;
a second segment fastened to an inner surface of the side frame; and
a third segment, wherein the first segment, the second segment, and the third segment are sequentially connected, wherein an extension path of the third segment is parallel to the plane on which the opening is located, wherein a part of the third segment is located outside the housing, and wherein a positive terminal and a negative terminal are disposed on the part of the third segment that is located outside the housing.

3. The terminal device of claim 2, wherein the electrical connection structure is a flexible circuit board.

4. The terminal device of claim 1, further comprising a connection lug disposed on an outer surface of the side frame, wherein the edge of the housing at the opening is fastened to the first middle frame by the connection lug.

5. The terminal device of claim 4, wherein the connection lug comprises:
a fastening part fastened to the outer surface of the side frame;
a lug part fastened to the fastening part; and
a connection hole disposed in the lug part, wherein an axial direction of the connection hole is consistent with an extension direction of a central axis of the opening.

6. The terminal device of claim 1, wherein the edge of the housing at the opening is welded to the first middle frame.

7. The terminal device of claim 1, wherein the opening of the housing is blocked by the first middle frame to form a closed housing.

8. The terminal device of claim 1, wherein the first screen comprises a first part and a second part, and the first part of the first screen is located on the first side of the first middle frame, wherein the terminal device further comprises a second middle frame rotatably connected to the first middle frame, wherein the second part is disposed on one side of the second middle frame and is stacked with the second middle frame, wherein the terminal device can change between an unfolded state and a folded state, wherein when the terminal device is in the unfolded state, the first part of the first screen and the second part of the first screen face a same side, and wherein when the terminal device is in the folded state, the first part of the first screen and the second part of the first screen face each other or back onto each other.

9. The terminal device of claim 8, wherein when the terminal device is in the folded state, the first part of the first screen and the second part of the first screen face each other, and wherein the terminal device further comprises a second screen located on a side of the vibration motor that is away from the first middle frame, the second screen and the first middle frame are relatively fastened, and the vibration motor and the second screen are spaced from each other.

10. The terminal device of claim 9, wherein a width of a gap between the vibration motor and the second screen is greater than or equal to 0.05 millimeters and less than or equal to 0.35 millimeters.

11. The terminal device of claim 1, wherein a height of the vibration motor is less than or equal to 3.0 millimeters.

12. A vibration motor, comprising:

a housing, wherein one end of the housing is opened to form an opening, wherein a gummed paper removable dust-proof structure covers the opening, and wherein the housing comprises:

a top wall; and a side frame disposed around a circumference of the top wall, wherein an end of the side frame that is away from the top wall surrounds the opening;

a mass block disposed in the housing, wherein the mass block is configured to reciprocally vibrate relative to the housing on a plane parallel to a plane on which the opening is located; and a drive assembly, comprising:

a magnet assembly fastened to the mass block; and a coil located between the mass block and the top wall, wherein the coil is fastened to an inner surface of the top wall, the magnet assembly cooperates with the coil to generate a Lorentz force, and the Lorentz force is configured to drive the mass block to reciprocally vibrate relative to the housing on the plane parallel to the plane on which the opening is located.

13. The vibration motor of claim 12, further comprising a connection lug disposed on an outer surface of the side frame, wherein the connection lug comprises:

a fastening part fastened to the outer surface of the side frame;

a lug part fastened to the fastening part;

a connection hole disposed in the lug part, wherein an axial direction of the connection hole is consistent with an extension direction of a central axis of the opening.

14. The vibration motor of claim 12, wherein the vibration motor further comprises an electrical connection structure, comprising:

a first segment fastened to an inner surface of the top wall, and fastened to and electrically connected to the coil;

a second segment fastened to an inner surface of the side frame; and a third segment, wherein the first segment, the second segment, and the third segment are sequentially connected, wherein an extension path of the third segment is parallel to the plane on which the opening is located, wherein a part of the third segment is located outside the housing, and wherein a positive terminal and a negative terminal are disposed on the part of the third segment that is located outside the housing.

15. The vibration motor of claim 14, wherein the electrical connection structure is a flexible circuit board.

16. The vibration motor of claim 12, wherein an edge of the housing at the opening is configured to be welded to a first middle frame of a terminal device.

17. The vibration motor of claim 16, wherein the opening of the housing is configured to be coupled to the first middle frame to block the opening to form a closed housing.

18. The vibration motor of claim 12, wherein a height of the vibration motor is less than or equal to 3.0 millimeters.

19. A vibration motor, comprising:

a housing, wherein one end of the housing is opened to form an opening, wherein the housing comprises:

a top wall; and a side frame disposed around a circumference of the top wall, wherein an end of the side frame that is away from the top wall surrounds the opening;

a mass block disposed in the housing, wherein the mass block is configured to reciprocally vibrate relative to the housing on a plane parallel to a plane on which the opening is located; and a drive assembly, comprising:

a magnet assembly fastened to the mass block;

a coil located between the mass block and the top wall, wherein the coil is fastened to an inner surface of the top wall, the magnet assembly cooperates with the coil to generate a Lorentz force, and the Lorentz force is configured to drive the mass block to reciprocally vibrate relative to the housing on the plane parallel to the plane on which the opening is located; and an electrical connection structure, comprising:

a first segment fastened to an inner surface of the top wall, and fastened to and electrically connected to the coil;

a second segment fastened to an inner surface of the side frame; and a third segment, wherein the first segment, the second segment, and the third segment are sequentially connected, wherein an extension path of the third segment is parallel to the plane on which the opening is located, wherein a part of the third segment is located outside the housing, and wherein a positive terminal and a negative terminal are disposed on the part of the third segment that is located outside the housing.

20. The vibration motor of claim 19, further comprising a connection lug disposed on an outer surface of the side frame, wherein the connection lug comprises:

a fastening part fastened to the outer surface of the side frame;

a lug part fastened to the fastening part;

a connection hole disposed in the lug part, wherein an axial direction of the connection hole is consistent with an extension direction of a central axis of the opening.

* * * * *